US011656098B2

(12) United States Patent
Degois

(10) Patent No.: US 11,656,098 B2
(45) Date of Patent: May 23, 2023

(54) DEVICE, SYSTEM AND METHOD FOR DETERMINING A POSITION OF A MAGNET

(71) Applicant: Melexis Technologies SA, Bevaix (CH)

(72) Inventor: Jerome Degois, Paris (FR)

(73) Assignee: MELEXIS TECHNOLOGIES SA, Bevaix (CH)

( * ) Notice: Subject to any disclaimer, the term of this patent is extended or adjusted under 35 U.S.C. 154(b) by 0 days.

(21) Appl. No.: 17/188,561

(22) Filed: Mar. 1, 2021

(65) Prior Publication Data

US 2021/0278245 A1    Sep. 9, 2021

(30) Foreign Application Priority Data

Mar. 6, 2020 (EP) .................................. 20161370

(51) Int. Cl.
*G01D 5/14* (2006.01)
(52) U.S. Cl.
CPC .............. *G01D 5/14* (2013.01); *G01D 5/147* (2013.01)
(58) Field of Classification Search
CPC .................................. G01D 5/14; G01D 5/147
See application file for complete search history.

(56) References Cited

U.S. PATENT DOCUMENTS

| 8,030,917 | B2 * | 10/2011 | Hatanaka | G01D 5/145 |
| | | | | 73/514.39 |
| 8,072,209 | B2 | 12/2011 | Jerance et al. | |
| 8,203,333 | B2 * | 6/2012 | Hatanaka | G01D 5/145 |
| | | | | 324/207.25 |
| 8,970,210 | B2 | 3/2015 | Masson et al. | |
| 9,057,629 | B2 * | 6/2015 | Hohe | G01D 5/145 |
| 9,671,214 | B2 | 6/2017 | Ausserlechner | |
| 9,719,771 | B2 * | 8/2017 | Ausserlechner | G01D 5/12 |

(Continued)

FOREIGN PATENT DOCUMENTS

| CN | 209355950 U * | 9/2019 | ............... G01B 7/30 |
| EP | 3450926 A1 | 3/2019 | |

(Continued)

OTHER PUBLICATIONS

Extended Search Report from corresponding EP Application No. EP20161370.0, dated Aug. 25, 2020.

(Continued)

*Primary Examiner* — Walter L Lindsay, Jr.
*Assistant Examiner* — Milton Gonzalez
(74) *Attorney, Agent, or Firm* — Workman Nydegger

(57) ABSTRACT

A magnetic sensor system includes a magnet and a sensor device. The magnet has a shape and is movable along an axis between a first position and a second position and is optionally also rotatable about this axis. The magnetic sensor device has a plurality of magnetic sensitive elements for measuring at least two orthogonal magnetic field components or at least two orthogonal magnetic field gradients, and a processing circuit for determining an axial position of the magnet or whether the magnet is located in the first or second position based on the first and second magnetic field components or gradients, and optionally also for estimating or calculating an angular position of the magnet. A method of determining the axial and/or angular position. A magnetic sensor device includes features of the magnetic sensor system.

20 Claims, 12 Drawing Sheets

(56) References Cited

U.S. PATENT DOCUMENTS

| | | |
|---|---|---|
| 9,915,552 B2 * | 3/2018 | Ausserlechner ....... G01D 5/145 |
| 2013/0218517 A1 | 8/2013 | Ausserlechner |
| 2015/0022192 A1 | 1/2015 | Ausserlechner |
| 2017/0219382 A1 | 8/2017 | Ausserlechner |
| 2018/0372475 A1 | 12/2018 | Yoshiya |
| 2021/0325168 A1 * | 10/2021 | Lv .......................... H05K 1/189 |

FOREIGN PATENT DOCUMENTS

| | | |
|---|---|---|
| EP | 3686560 A1 | 7/2020 |
| JP | 2009300262 A * | 12/2009 |

OTHER PUBLICATIONS

Search Report from corresponding European Application No. 21159804.0, dated Jul. 26, 2021.

* cited by examiner

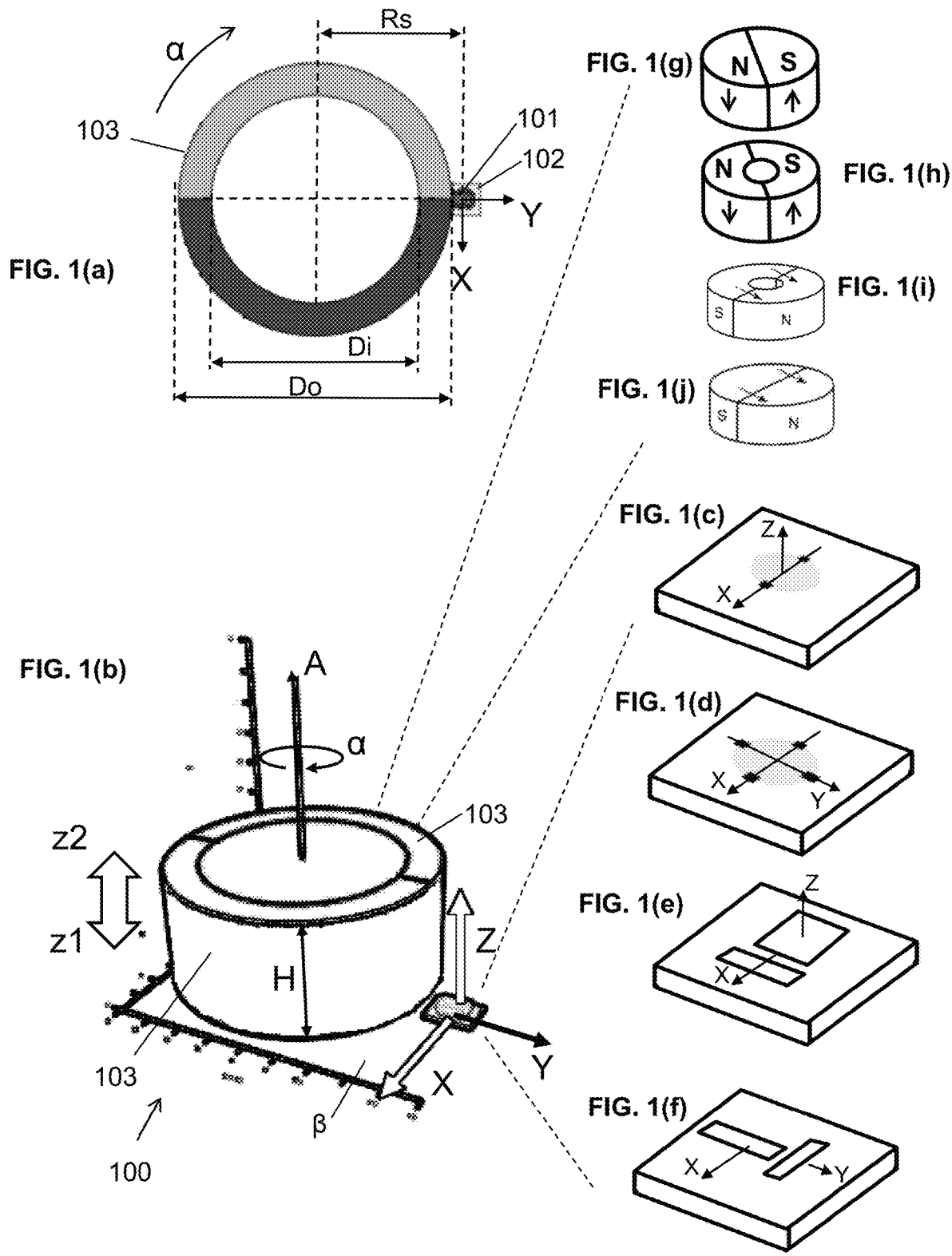

or or or

DEVICE, SYSTEM AND METHOD FOR DETERMINING A POSITION OF A MAGNET

FIELD OF THE INVENTION

The present invention relates in general to the field of magnetic position sensor systems, devices and methods. The present invention relates in particular to magnetic sensor systems capable of determining at least an axial position of a magnet movable along an axis, and optionally also an angular position of said magnet.

BACKGROUND OF THE INVENTION

Magnetic position sensor systems, in particular linear position sensor systems and angular position sensor systems are known in the art. They offer the advantage of being able to measure a linear or angular position without making physical contact, thus avoiding problems of mechanical wear, scratches, friction, etc.

Many variants of position sensor systems exist, addressing one or more of the following requirements: using a simple or cheap magnetic structure, using a simple or cheap sensor device, being able to measure over a relatively large range, being able to measure with great accuracy, requiring only simple arithmetic, being able to measure at high speed, being highly robust against positioning errors, being highly robust against an external disturbance field, providing redundancy, being able to detect an error, being able to detect and correct an error, having a good signal-to-noise ratio (SNR), etc.

The present invention is mainly related to determining a position of a movable magnet, which may e.g. be connected to or incorporated in a control button of domestic appliances or whitegoods, for example a push-button, or a rotary push-button.

SUMMARY OF THE INVENTION

It is an object of embodiments of the present invention to provide a magnetic position sensor system.

It is an object of embodiments of the present invention to provide a magnetic sensor system comprising a magnet and a magnetic sensor device, wherein the magnet is movable along an axis between a first and a second axial position, and wherein the sensor device is located at a non-zero distance from said axis (i.e. offset from said axis), and wherein the magnetic sensor device is capable of at least determining a position of the magnet along said axis.

It is an object of embodiments of the present invention to provide such a system wherein the magnetic sensor device is capable of determining whether the magnet is in a first predefined position or a second predefined position along said axis.

It is an object of embodiments of the present invention to provide such a system wherein the magnet is furthermore rotatable about said axis, and wherein the magnetic sensor device is furthermore capable of determining or estimating an angular position of the magnet about said axis.

It is also an object of embodiments of the present invention to provide a magnetic sensor system where the magnet is rotatable about its axis, but the sensor device only needs to provide information about the axial position.

It is also an object of embodiments of the present invention to provide a magnetic sensor system where the magnet is not rotatable about its position, but can assume any arbitrary angular position relative to the sensor device, and wherein the sensor device is capable of providing information about the axial position, irrespective of said angular position.

It is an object of particular embodiments of the present invention to provide such a system, device and method, wherein the magnet has a shape which is circular symmetric about said axis, such as e.g. a disk magnet or a ring magnet, or a cylindrical magnet.

It is an object of particular embodiments of the present invention to provide such a system, device and method, wherein the magnet has a cylindrical shape (e.g. a disk magnet or a ring magnet) with an outer radius, and wherein the magnet is rotatable about said axis, and wherein the sensor device is located at a radial distance from said axis larger than said outer radius.

It is an object of particular embodiments of the present invention to provide such a system, device and method, wherein the axial and/or angular position can be determined or estimated in a simple manner, e.g. without requiring a discrete Fourier Transform.

It is an object of particular embodiments of the present invention to provide such a system, device and method, which is highly robust against an external disturbance field, and/or against demagnetization, and/or against temperature variations.

According to a first aspect, the present invention provides a magnetic sensor system comprising: a permanent magnet movable along an axis between a first position and a second position, and being rotatable about said axis (A) or having an unknown angular position (a) about said axis (A), and generating a magnetic field which is not circular symmetric about said axis (A); a magnetic sensor device located at an offset from said axis, and comprising a first set of magnetic sensitive elements located in a first sensor location and configured for measuring at least a first magnetic field component (e.g. Bx) in a first direction (X) and a second magnetic field component (e.g. By; Bz) in a second direction (e.g. Y; Z) perpendicular to the first direction (e.g. X); wherein the magnetic sensor device is oriented such that the first direction is oriented substantially circumferential with respect to said axis, and such that the second direction is either substantially parallel to the axis or substantially radial to the axis; and wherein the magnetic sensor device further comprises a processing circuit configured for determining an axial position of the magnet along said axis based on at least the first magnetic field component (e.g Bx) and the second (e.g By; Bz) magnetic field component, or values derived therefrom; and optionally wherein the processing circuit is further configured for estimating or calculating an angular position of the magnet based at least on the measured first and second magnetic field component.

With "[the magnet] generating a magnetic field which is not circular symmetric about said axis" is meant that the magnetic field changes as the magnet rotates about its axis. The reader unfamiliar with the term "circular symmetric" can refer to https://en.wikipedia.org/wiki/Circular_symmetry. One could also say that the magnet is not a two-pole magnet having a single north pole (e.g. at its upper surface) and a single south pole (e.g. at its lower surface). Examples of suitable magnets are shown in FIG. 1(g) to FIG. 1(j), but an axially magnetized magnet having more than one north pole and more than one south pole at each of its upper surface and bottom surface, can also be used, for example a magnet having four poles (2 North poles and 2 South poles) at its top surface and having four poles at its bottom surface.

In an embodiment, the magnet has a cylindrical shape or a shape with circular symmetry about said axis.

In an embodiment, the magnet has an outer radius, and a distance between the magnetic sensor device and said axis is at least 50% of said outer radius, or at least 60%, or at least 100%, or at least 105%.

In some embodiments, the distance between the magnetic sensor device and said axis is larger than the outer radius of the magnet.

In an embodiment, the second axis is perpendicular to the axis of the magnet and intersects the axis of the magnet.

In an embodiment, the second axis is perpendicular to the axis of the magnet and is offset from the axis of the magnet (not shown).

In an embodiment, the second magnetic field component is oriented radially with respect to the axis.

In an embodiment, the processing circuit is configured for determining the axial position of the magnet based on the first magnetic field component (Bx) oriented in the circumferential direction, and a second magnetic field component oriented in the axial direction (Bz).

In an embodiment, the processing circuit is configured for determining the axial position of the magnet based on the first magnetic field component (Bx) oriented in the circumferential direction, and a second magnetic field component oriented in the radial direction (By).

In an embodiment, the processing circuit is configured for determining whether the magnet is located in said first position (z1) or in said second position (z2) based on at least the first magnetic field component (Bx1) and the second (By1; Bz1) magnetic field component.

In an embodiment, the processing circuit is configured for determining said axial position by calculating a product of the first or second magnetic field component and a predefined constant (e.g. K), and by calculating a sum of a square of this product and a square of the other magnetic field component (e.g. By, Bz); and wherein the processing circuit is further configured for determining the axial position based on this sum.

In an embodiment, the magnetic sensor device is configured for comparing this sum with a (predefined constant or dynamic) threshold; and if this sum is larger than said threshold, to determine that the magnet is in a first predefined position along said axis; and if this sum is smaller than said threshold, to determine that the magnet is in a second predefined position along said axis.

This magnetic sensor system is ideally suited for testing whether a button, connected to said magnet, is pressed or not. This button is configured to be in one of two predefined positions along said axis, z1 corresponding to the button being pressed, z2 corresponding to the button being released.

In an embodiment, the processing circuit is configured for determining the sum in accordance with one of the following formulas: sum=sqr(K*Bx)+sqr(By), or sum=sqr(K*Bx)+sqr(Bz), or sum=sqr(Bx)+sqr(K*By), or sum=sqr(Bx)+sqr(K*Bz), where sqr(..) means the square function, K is a predefined constant value, Bx is the magnetic field component oriented in the circumferential direction, Bz is the magnetic field component oriented in the axial direction (or radial direction), By is the magnetic field component oriented in the radial direction (or axial direction). The value of K may be dependent on the dimensions of the magnet and/or the relative position and/or orientation of the sensor device relative to the magnet, and can be determined e.g. by simulations, or by calibration, or in any other suitable way, and can be stored e.g. in a non-volatile memory of the sensor device.

In an embodiment, the magnetic sensor device further comprises a second set of magnetic sensitive elements in a second sensor location spaced from the first sensor location in the first direction, and configured for measuring a third magnetic field component (e.g. Bx2) parallel to the first magnetic field component (e.g. Bx1), and a fourth magnetic field component (e.g. By2, Bz2) parallel to the second magnetic field component (e.g. By1, Bz1); and wherein the processing unit is further configured for calculating a first magnetic field gradient (e.g. dBx/dx) based on the first and the third magnetic field component (e.g. Bx1, Bx3), and for calculating the second magnetic field gradient (e.g. dBy/dx; dBz/dx) based on the second and the fourth magnetic field component (e.g. By2, By4; Bz2, Bz4); and wherein the processing circuit is further configured for determining the axial position of the magnet based at least on the first and second magnetic field gradient (e.g. dBx/dx; dBy/dx, dBz/dx).

In an embodiment, the processing circuit is configured for calculating a product by multiplying one of the first and second magnetic field gradient with a predefined constant (e.g. K), and for calculating a sum of a square of this product and a square of the other magnetic field gradient; and wherein the processing circuit is configured for determining the axial position based on this sum.

In an embodiment, the processing circuit is further configured for comparing this sum with a predefined threshold; and if this sum is larger than said threshold, to determine that the magnet is in a first predefined position along said axis; and if this sum is smaller than said threshold, to determine that the magnet is in a second predefined position along said axis.

In an embodiment, the processing circuit is configured for determining the sum in accordance with one of the following formulas: sum=sqr(K*dBx/dx)+sqr(dBy/dx), or sum=sqr(K*dBx/dx)+sqr(dBz/dx), or sum=sqr(dBx/dx)+sqr(K*dBy/dx), or sum=sqr(dBx/dx)+sqr(K*dBz/dx), where sqr(..) means the square function; K is a predefined constant value, Bx is the magnetic field component oriented in the circumferential direction, Bz is the magnetic field component oriented in the axial direction (or radial direction), By is the magnetic field component oriented in the radial direction (or axial direction), dBx/dx is a gradient of the magnetic field component oriented in the circumferential direction along the circumferential direction, dBy/dx is a gradient of the magnetic field component oriented in the radial (or axial) direction along the circumferential direction, and dBz/dx is a gradient of the magnetic field component oriented in the axial (or radial) direction along the circumferential direction.

The value of K may be dependent on the dimensions of the magnet and/or the relative position and/or orientation of the sensor device relative to the magnet, and can be determined e.g. by simulations, or by calibration, or in any other suitable way, and can be stored e.g. in a non-volatile memory of the sensor device.

In an embodiment, the magnet is a ring or disk magnet having at least one North pole and at least one South pole at its top surface and having at least one North pole and at least one South pole at its bottom surface.

In an embodiment, the magnet is a radially magnetized ring or disk magnet.

In an embodiment, the magnet is a diametrically magnetized ring or disk magnet.

In an embodiment, the processing circuit is further configured for calculating the angular position based on a product of a predefined constant and a ratio of the first magnetic field component (e.g. Bx) and the second magnetic field component (e.g. By, Bz), for example as an arctangent function of said constant and said ratio.

In an embodiment, the processing circuit is configured for determining the angular position in accordance with one of the following formulas:

angle=arctan($K*Bx/By$), or angle=arctan($K*Bx/Bz$), or angle=arctan($Bx/K*By$), or angle=arctan($Bx/K*Bz$), wherein arctan(..) is the arctangent function, Bx is the magnetic field component oriented in the circumferential direction of the magnet, By is the magnetic field component oriented in the radial (or axial) direction of the magnet, Bz is the magnetic field component oriented in the axial (or radial) direction of the magnet, and K is a predefined constant.

In an embodiment, the processing circuit is further configured for estimating or calculating an angular position of the magnet based at least on the first (e.g. dBx/dx) and second (e.g. dBy/dx; dBz/dx) magnetic field gradient.

In an embodiment, the processing circuit is configured for determining the angular position in accordance with one of the following formulas: angle=a tan 2($K*dBx/dx$, dBy/dx), or angle=a tan 2($K*dBx/dx,dBz/dx$), or angle=a tan 2($dBx/dx,K*dBy/dx$), or angle=a tan 2($dBx/dx,K*dBz/dx$), wherein a tan 2(..) is the arctangent function written in a format with two arguments, dBx/dx is the gradient of the magnetic field component oriented in the circumferential direction along the circumferential direction, dBy/dx is the gradient of the magnetic field component oriented in the radial (or axial) direction along the circumferential direction, dBz/dx is the gradient of the magnetic field component oriented in the axial (or radial) direction along the circumferential direction, and K is a predefined constant.

In an embodiment, the processing circuit is configured for estimating the angular position based on a ratio of the first magnetic field component (e.g. Bx) and the second magnetic field component (e.g. By, Bz); and the processing circuit is configured for determining a dynamic threshold as a function of the estimated angle; and the processing circuit is further configured for determining a sum of squares of the first magnetic field component (e.g. Bx) and a second magnetic field component (e.g. By, Bz), and for comparing the sum with the dynamic threshold; and if the sum is larger than said dynamic threshold, to determine that the magnet is in a first predefined position along said axis; and if this sum is smaller than said threshold, to determine that the magnet is in a second predefined position along said axis (A).

The angular position may be estimated using an arctangent function, or using a list of combinations of values, or using a look-up table with interpolation, or in any other suitable way.

In an embodiment, the processing circuit is further configured for updating the angular position based on a product of a first predefined constant (e.g. K1) and a ratio of the first magnetic field component (e.g. Bx) and the second magnetic field component (e.g. By, Bz) if the magnet is in the first predefined position (e.g. z1), and for updating the angular position based on a product of a second predefined constant (e.g. K2) and a ratio of the first magnetic field component (e.g. Bx) and the second magnetic field component (e.g. By, Bz) if the magnet is in the second predefined position (e.g. z2).

The angular position may be estimated using an arctangent function, or using a list of combinations of values, or using a look-up table with interpolation, or in any other suitable way.

In an embodiment, the processing circuit is configured for estimating the angular position based on a ratio of the first magnetic field gradient (e.g. dBx/dx) and the second magnetic field gradient (e.g. dBy/dx, dBz/dx); and wherein the processing circuit is configured for determining a dynamic threshold as a function of the estimated angle; and wherein the processing circuit is further configured for determining (e.g. calculating) a sum of squares of the first magnetic field gradient (e.g. dBx/dx) and the second magnetic field gradient (e.g. dBy/dx, dBz/dx), and for comparing the sum with the dynamic threshold; and if the sum is larger than said dynamic threshold, to determine that the magnet is in a first predefined position along said axis; and if this sum is smaller than said threshold, to determine that the magnet is in a second predefined position along said axis.

The angular position may be estimated using an arctangent function, or using a list of combinations of values, or using a look-up table with interpolation, or in any other suitable way.

In an embodiment, the processing circuit is further configured for updating the angular position based on a product of a first predefined constant (e.g. K1) and a ratio of the first magnetic field gradient (e.g. dBx/dx) and the second magnetic field gradient (e.g. dBy/dx, dBz/dx) if the magnet is in the first predefined position, and for updating the angular position based on a product of a second predefined constant (e.g. K2) and a ratio of the first magnetic field gradient (e.g. dBx/dx) and the second magnetic field gradient (e.g. dBy/dx, dBz/dx) if the magnet is in the second predefined position.

In an embodiment, the magnetic sensor device is oriented such that its substrate is perpendicular to the axis of the magnet. In this case the first axis (also referred to herein as the X-axis) is oriented in a circumferential direction, and the Y-axis is oriented in a radial direction, and the Z-axis is parallel to the axis of the magnet.

In an embodiment, the magnetic sensor device is oriented such that its substrate is parallel to the axis of the magnet. In this case the first axis (also referred to herein as the X-axis) is oriented in a circumferential direction, and the Z-axis is oriented in a radial direction, and the Y-axis is parallel to the axis of the magnet.

In an embodiment (wherein the axial position is determined based on magnetic field components), the magnetic sensor device comprises at least one sensor arrangement comprising an integrated magnetic concentrator (IMC) and at least two horizontal Hall elements arranged on opposite sides of the magnetic concentrator (IMC).

In an embodiment (wherein the axial position is determined based on magnetic field gradients), the magnetic sensor device comprises at least two such sensor arrangements, spaced apart in the X-direction, e.g. over a distance of about 1.0 mm to about 2.0 mm, thus comprising 2 IMC+4 Horizontal Hall elements.

In an embodiment (wherein the axial position is determined based on magnetic field components), the magnetic sensor device comprises at least one sensor arrangement comprising one horizontal Hall element and at least one vertical Hall element, oriented with their axes of maximum sensitivity in the axial direction or circumferential direction of radial direction of the magnet.

In an embodiment (wherein the axial position is determined based on magnetic field gradients), the magnetic sensor device comprises at least two such sensor arrangements, spaced apart in the X-direction, e.g. over a distance of about 1.0 mm to about 2.0 mm, thus comprising 2 horizontal Hall elements+2 vertical Hall elements.

In an embodiment (wherein the axial position is determined based on magnetic field components), the magnetic sensor device comprises at least one sensor arrangement comprising a first and a second vertical Hall element, respectively having a first and second axis of maximum sensitivity, oriented perpendicular to each other, and both oriented in the axial direction or circumferential direction of radial direction of the magnet.

In an embodiment (wherein the axial position is determined based on magnetic field gradients), the magnetic sensor device comprises at least two such sensor arrangements, spaced apart in the X-direction, e.g. over a distance of about 1.0 mm to about 2.0 mm, thus comprising 4 vertical Hall elements.

In an embodiment, the magnet is an axially magnetized two-pole magnet, e.g. an axially magnetised ring magnet or an axially magnetised disk magnet.

In an embodiment, the magnet is a diametrically magnetized magnet, e.g. a diametrically magnetised ring magnet or a diametrically magnetised disk magnet.

In an embodiment, the magnet is an axially magnetised multipole magnet having at least four poles (namely: a North pole and a South pole at its top surface, and a North pole and a South pole at its bottom surface), or at least eight poles (namely: two North poles and two South poles at its top surface, and two North poles and two South poles at its bottom surface).

In an embodiment, the magnet is a ring magnet having an inner diameter and an outer diameter, and a ratio of the inner diameter and the outer diameter Di/Do is a value in the range from 60% to 90%. These magnets have relatively thin wall.

In an embodiment, the magnet is a ring magnet having an inner diameter and an outer diameter and a height, and a ratio of the height and the outer diameter H/Do is a value in the range from 25% to 70%, or in the range from 30% to 65%, or in the range from 35% to 60%.

In an embodiment, the magnet is ring magnet or a disk magnet having a height and an outer diameter, and the height is smaller than the outer diameter.

In an embodiment, the magnet has an outer radius Ro, and the sensor device is located at a distance from the axis of the magnet of at least 50% of said outer radius, or at least 75%, or at least 100%, or at least 105%.

In an embodiment, the magnet is a ring or disk magnet having a top surface and a bottom surface and a cylindrical wall with an outer radius; and the sensor device is located at a radial distance from said axis larger than said outer radius; and the sensor device is located outside of the space between a top plane containing or tangential to said top surface and a bottom plane containing or tangential to said bottom surface when the magnet is in at least one of its first and second axial position. Or stated in other words: the sensor device is located "in the corner" of the magnet, when the magnet is in its first position, or in its second axial position, or both, e.g. as illustrated in FIG. 1(k) to FIG. 1(n). The magnet is axially movable and may have a fixed but unknown angular position; or the magnet is axially movable and may have a variable unknown angular position (but the angular position is irrelevant, i.e. may be determined internally but does not have to be output); or the magnet is axially movable and is rotatable (and both the axial and the angular position are to be determined and are to be output). The magnet may be part of a push button or of a rotatable push-button.

In a variant (not explicitly shown), the magnet is a ring or disk magnet having a top surface and a bottom surface and a cylindrical wall with an outer radius; and the sensor device is located at a radial distance from said axis substantially equal to said outer radius (e.g. at a radius of about 90% to about 110% of said outer radius), or smaller than said outer radius (e.g. at a radius of about 30% to about 90% of said outer radius); and the sensor device is located outside of the space between a top plane containing or tangential to said top surface and a bottom plane containing or tangential to said bottom surface when the magnet is in at least one of its first and second axial position. Or stated in other words: the sensor device is located "below the bottom surface" of the magnet, when the magnet is in its first position, or in its second axial position, or both. The magnet is axially movable and may have a fixed but unknown angular position; or the magnet is axially movable and may have a variable unknown angular position (but the angular position is irrelevant, i.e. may be determined internally but does not have to be output); or the magnet is axially movable and is rotatable (and both the axial and the angular position are to be determined and are to be output). The magnet may be part of a push button or of a rotatable push-button.

According to a second aspect, the present invention also provides a method of determining an axial position and optionally also an angular position of a magnet in a system according to the first aspect, the method comprising the steps of: measuring at a first sensor location said first magnetic field component (e.g. Bx) oriented in the first direction (e.g. X), and said second magnetic field component (e.g. By1; Bz1) oriented in the second direction (e.g. Y; Z) perpendicular to the first direction; determining the axial position and optionally also the angular position of the magnet based at least on the first magnetic field component (e.g. Bx) and the second (e.g. By; Bz) magnetic field component.

In an embodiment, the sensor device is configured for determining two orthogonal magnetic field gradients, and the method comprises the steps of: measuring said first magnetic field gradient (e.g. dBx/dx) oriented in the first direction (e.g. X), and said second magnetic field gradient (e.g. dBy/dx; dBz/dx) oriented in the second direction (e.g. Y; Z) perpendicular to the first direction; determining the axial position of the magnet based at least on the first magnetic field gradient (e.g. dBx/dx) and the second magnetic field gradient (e.g. dBy/dx, dBz/dx).

In an embodiment, the method further comprises the step of calculating a product of the first or second magnetic field component (e.g. Bx) and a predefined constant (e.g. K), and calculating a sum of a square of this product and a square of the other magnetic field component (e.g. By, Bz); and determining the axial position of the magnet based on this sum of squares.

In an embodiment, the method further comprises the step of comparing this sum with a (predefined or dynamically determined) threshold; and if this sum is larger than said threshold, to determine that the magnet is in a first predefined position along said axis; and if this sum is smaller than said threshold, to determine that the magnet is in a second predefined position along said axis.

The present invention is also directed to a method of determining an axial position and estimating or determining an angular position of the magnet, based on at least two magnetic field components.

The present invention is also directed to a method of determining an axial position and estimating or determining an angular position of the magnet, based on at least two magnetic field gradients.

According to a third aspect, the present invention also provides a magnetic sensor device for use in the magnetic sensor system according to the first aspect, the magnetic sensor device comprising: a substrate comprising a first set of magnetic sensitive elements located in a first sensor location, configured for measuring at least a first magnetic field component (e.g. Bx) in a first direction (e.g. X) and a second magnetic field component (e.g. By; Bz) in a second direction (e.g. Y; Z) perpendicular to the first direction; a processing circuit configured for determining an axial position of the magnet or for determining whether the magnet is located in the first axial position or the second axial position based on at least the first magnetic field component (e.g. Bx) and the second (e.g. By; Bz) magnetic field component, or values derived therefrom.

In an embodiment, the magnetic sensor device is further configured for determining whether the magnet is located in said first position or in said second position.

In an embodiment, the magnet is furthermore rotatable about its axis, and the magnetic sensor device is further configured for determining an angular position of the magnet, based at least on these magnetic field components, or values derived therefrom.

In an embodiment, the magnetic sensor device further comprises a second set of magnetic sensitive elements in a second sensor location spaced (e.g. dx) from the first sensor location in the first direction (e.g. X), and configured for measuring a third magnetic field component (e.g. Bx2) parallel to the first magnetic field component (e.g. Bx1), and a fourth magnetic field component (e.g. By2, Bz2) parallel to the second magnetic field component (e.g. By1, Bz1); and the processing unit is further configured for calculating a first magnetic field gradient (e.g. dBx/dx) based on the first and third magnetic field component, and for calculating a second magnetic field gradient (e.g. dBy/dx; dBz/dx) based on the second and fourth magnetic field component; and the processing circuit is further configured for determining said axial position of the magnet, or for determining whether the magnet is in said first or second position based at least on the first and second magnetic field gradient (e.g. dBx/dx; dBy/dx, dBz/dx).

In an embodiment, the magnet is rotatable about its axis, and the magnetic sensor device is further configured for determining an angular position of the magnet, based at least on these magnetic field gradients.

According to another aspect, the present invention also provides a push-button system or a rotary push-button system comprising a position sensor system according to the first aspect.

Particular and preferred aspects of the invention are set out in the accompanying independent and dependent claims. Features from the dependent claims may be combined with features of the independent claims and with features of other dependent claims as appropriate and not merely as explicitly set out in the claims. These and other aspects of the invention will be apparent from and elucidated with reference to the embodiment(s) described hereinafter.

BRIEF DESCRIPTION OF THE DRAWINGS

FIG. 1(a) and FIG. 1(b) shows an illustrative sensor arrangement according to an embodiment of the present invention, comprising a magnet which is movable along an axis and which is rotatable about said axis, in top view and perspective view respectively.

FIG. 1(c) to FIG. 1(f) show a few sensor structures which may be used in the sensor device. FIG. 1(g) to FIG. 1(j) show a few magnets which can be used in this sensor system.

FIG. 3 shows waveforms of Bx and By for two axial positions of the magnet.

In FIG. 9 the sensor device is oriented with its substrate perpendicular to the rotation axis of the magnet. In FIG. 10 the sensor device is oriented with its substrate parallel to the rotation axis of the magnet.

Figure 1K:
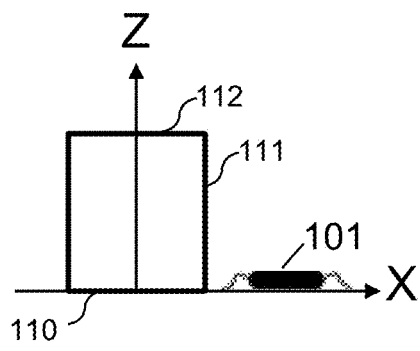
FIG. 1(k) and FIG. 1(L) illustrate a sensor arrangement in which the sensor device faces the cylindrical wall of the magnet when in its first axial position but does not face the cylindrical wall of the magnet when in its second axial position, or stated in other words, the sensor device is positioned outside of the space between two parallel planes contacting the top and the bottom surface of the magnet, when the magnet is in its second axial position.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

FIG. 1(a) and FIG. 1(b) show an illustrative sensor arrangement 100 comprising a ring magnet 103 in top view and perspective view respectively. The magnet 103 of FIG. 1 has a circular symmetrical shape (not taking into account the magnetization, only the mechanical shape) with a symmetry-axis A. The magnet is movable along said axis A towards and away from a plane β. In the embodiment shown in FIG. 1, the magnet is also rotatable about the axis A.

The magnet 103 of the system 100 shown in FIG. 1 is a ring magnet with an inner diameter Di, and an outer diameter Do, and a height H. In the example of FIG. 1, the ratio R=Di/Do of the inner diameter Di and the outer diameter Do is approximately equal to 75%, and the ratio of the height and the outer diameter is approximately equal to 60%, but the present invention is not limited to magnets with these specific dimensions, and also works for ring magnets with other dimensions, for example having a Di/Do ratio in the range from 50% to 90%, and having a H/Do ratio in the range from 40% to 100%. In fact, the present invention is not limited to ring magnets but also works for example for disk magnets, or for magnets having another circular symmetric shape about the axis A (not taking into account the magnetisation of the magnet, only its mechanical shape). The magnet may for example be incorporated in a plastic button of a domestic appliance, but the present invention is not limited thereto, and can also be used in other applications such as for example robotic applications, industrial applications, automotive applications, etc. The button may for example be pushed away from the plane β by means of a spring (not shown), but such mounting aspects are irrelevant for the present invention, as long as the magnet is movable along its axis A between a first position z1 and a second position z2.

The magnet 103 can for example be an axially magnetised ring or disk magnet having two poles (or at least two poles) at its top surface 112 and having two poles (or at least two poles) at its bottom surface 110 (see e.g. FIG. 1(g) and FIG. 1(h)), or may be a diametrically magnetised two-pole ring magnet (see e.g. FIG. 1(i)) or a diametrically magnetized two-pole disk magnet (see e.g. FIG. 1(j)), but the present invention is not limited hereto, and also works for other magnets, for example for an axially magnetized ring or disk magnet having four poles at its top surface and four poles at its bottom surface, or a radially magnetized or diametrically magnetized four-pole magnet, or a magnet having more than four poles.

The sensor arrangement 100 further comprises a magnetic sensor device 101.

In the example shown in FIG. 1, the magnetic sensor device is mounted on a printed circuit board (PCB) 102, which may be connected to a frame of a device, e.g. a domestic appliance.

In the example of FIG. 1(b), the magnetic sensor device is substantially located in the plane defined by a bottom surface of the ring magnet 102 when the magnet is in its first position z1, but that is not absolutely required for the invention to work, and the sensor device 101 may also be located at another axial position.

The magnetic sensor device 101 comprises a substrate (e.g. a semiconductor substrate) comprising a plurality of magnetic sensitive elements. The magnetic sensor device is configured for measuring at least two perpendicular magnetic field components. In order to describe how the present invention works, three orthogonal axes X,Y,Z are connected to the substrate of the magnetic sensor device 101, such that the X and Y axis are parallel to the semiconductor substrate, and the Z-axis is perpendicular to the semiconductor substrate. As stated above, in the embodiments of FIG. 1(a to j) and FIG. 2, the sensor device 101 is oriented such that the XY plane of the sensor device is parallel to the plane β, and the Z-axis is parallel to the A-axis of the magnet.

Preferably the semiconductor device is furthermore oriented such that its Y-axis intersects the A-axis of the magnet, in which case the X-axis is tangential to an imaginary circle about the A-axis of the magnet (also referred to as "circumferential direction"), but this is not absolutely required for the invention to work.

According to an aspect of the present invention, the magnetic sensor device 101 comprises at least a first set of magnetic sensitive elements configured for measuring a first magnetic field component Bx in the X-direction (e.g. circumferential direction of the magnet) and a second magnetic field component By oriented in the Y-direction (e.g. radial direction of the magnet), or for measuring a first magnetic field component Bx in the X-direction (e.g. circumferential direction of the magnet) and a second magnetic field component Bz oriented in the Z-direction (e.g. axial direction of the magnet).

FIG. 1(c) to FIG. 1(f) show several examples of sensor structures that can be used for measuring two orthogonal magnetic field components.

The sensor structure of FIG. 1(c) comprises two horizontal Hall elements (indicated by black squares) located on opposite sides of an integrated magnetic concentrator (IMC) disk. The two horizontal Hall elements are located on the X axis. This sensor structure can be used to measure a Bx component (e.g. by subtracting the signals obtained from the two Hall elements), and to measure a Bz component (e.g. by adding the signals obtained from the two Hall elements). The reader not familiar with this kind of sensor can refer to US2018372475 for more details, which document is incorporated herein in its entirety.

The sensor structure of FIG. 1(d) comprises four horizontal Hall elements (indicated by black squares) located at the periphery of an integrated magnetic concentrator (IMC) disk, angularly spaced by 90°. Two of the horizontal Hall elements are located on the X axis, two other of the horizontal Hall elements are located on the Y axis perpendicular to the X-axis. This sensor structure can be used to measure a Bx component (e.g. by subtracting the signals obtained from the two Hall elements located on the X axis), and to measure a By component (e.g. by subtracting the signals obtained from the two Hall elements located on the Y axis). Reference is made to US2018372475 for more details.

The sensor structure of FIG. 1(e) comprises a horizontal Hall element for measuring a Bz component, and a vertical Hall element oriented with its axis of maximum sensitivity in the X direction for measuring a Bx component.

The sensor structure of FIG. 1(f) comprises two vertical Hall elements, one for measuring a Bx component and another for measuring a By component.

It can be seen that in all these examples, a first magnetic component Bx is measured oriented in the X direction (circumferential direction of the magnet), and a second magnetic field component By or Bz is measured oriented in the Y or Z direction (radial or axial direction of the magnet). The X and Y axis define a plane perpendicular to the axis A of the magnet, the Z-axis is parallel to the axis A of the magnet. But the present invention is not limited to the sensor structures shown in FIG. 1(c) to FIG. 1(f) and other suitable sensor structures can also be used, for example sensor structures comprising magneto-resistive (MR) elements. In practice, the sensor elements (e.g. the two horizontal Hall elements of FIG. 1(c); the horizontal Hall element and the vertical Hall element of FIG. 1(f) are located closely together, e.g. within a radius of about 200 micron, such that the two orthogonal components can be considered to be measured at the same sensor location, referred to as "first sensor location" (in contrast to the sensor structures shown in FIG. 9 or FIG. 10, which have two sensor locations located respectively at position X1 and X2 on the X-axis, spaced apart by at least 1.0 mm).

Referring back to FIG. 1(a) and FIG. 1(b), it can be seen that the magnetic sensor device 101 is located at a position which is offset from the axis A. In preferred embodiments of the present invention, the "first sensor location" of the sensor device 101 is located at a distance "Rs" from the symmetry axis (A) of the magnet, which is at least 50% of the outer radius Ro of the magnet, or at least 70%, or at least 90%, or at least 100%, or at least 105%.

According to an aspect of the present invention, the sensor device 101 further comprises a processing circuit, e.g. a controller 1120 (not shown in FIG. 1, but see for example FIG. 11) configured for determining at least an axial position (z) of the magnet, and in some embodiments also an angular position (a) of the magnet, based on the measured field component values, for example based on the values Bx and By, or based on the values Bx and Bz, as will be explained in more detail further.

Figure 1L:
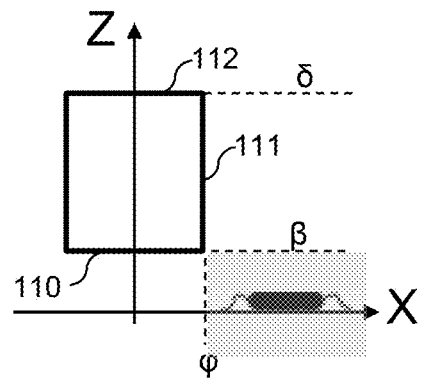

FIG. 1(k) and FIG. 1(l) illustrate a sensor system like that of FIG. 1(a) and FIG. 1(b) in side view, in which the sensor device is located at a radial distance of the rotation axis larger than the outer radius of the magnet. The sensor device 101 faces the cylindrical wall 111 of the magnet when the magnet is in its first axial position depicted in FIG. 1(k) but does not face the cylindrical wall of the magnet when the magnet is in its second axial position depicted in FIG. 1(l). Or stated in other words, in some axial positions of the magnet, the sensor device 101 is or may be situated in a space between a bottom plane β containing or tangential to the bottom surface 110 of the magnet, and a top plane containing or tangential to the top surface 112 of the magnet, while in other axial positions of the magnet, the sensor device 101 is located outside of said space, e.g. below said bottom plane β and at a radial position larger than the outer radius of the magnet, also referred to herein as "in the corner".

This space is defined by the bottom plane β containing or tangential to the bottom surface 110 of the magnet, and a cylindrical surface φ. A cross section of this space with a plane containing the rotation axis Z is shown in gray in FIG. 1(l) to FIG. 1(n).

An arrangement as shown in FIG. 1(k) and FIG. 1(l) can arise for example when the sensor device 101 is soldered to a printed circuit board (PCB), and the magnet is movable to abut the printed circuit board when in its first position. The sensor device may be configured for determining whether the magnet is in the first position (e.g. shown in FIG. 1(k)) or in the second position (e.g. shown in FIG. 1(l)).

Figure 1M:
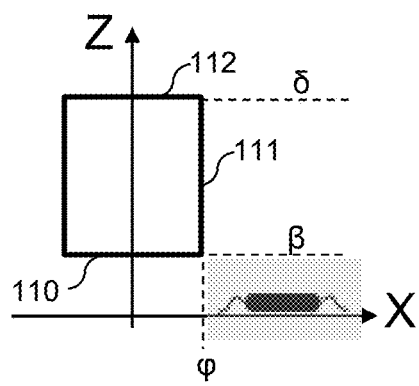
FIG. 1(m) and FIG. 1(n) illustrate a sensor arrangement in which the sensor device does not face the cylindrical wall of the magnet in any axial position of the magnet, or stated in other words, the sensor device is always positioned outside of the space between two parallel planes contacting the top and the bottom surface of the magnet.
Figure 1N:
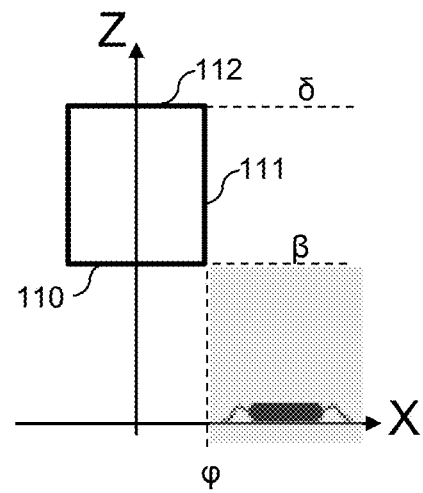

FIG. 1(m) and FIG. 1(n) illustrate a sensor system like that of FIG. 1(a) and FIG. 1(b) in side view, in which the sensor device 101 does not face the cylindrical wall 111 of the magnet in any axial position of the magnet between the first axial position and the second axial position. In other words, in these embodiments, the position of the sensor device 101 relative to the magnet is always "in the corner", i.e. below the bottom plane β containing or tangential to the bottom surface 110, and at a radial distance larger than the outer radius of the cylindrical magnet. The sensor device 101 may be configured for determining whether the magnet is in the first axial position (e.g. shown in FIG. 1(m)) or in the second axial position (e.g. shown in FIG. 1(n)).

Figure 2:
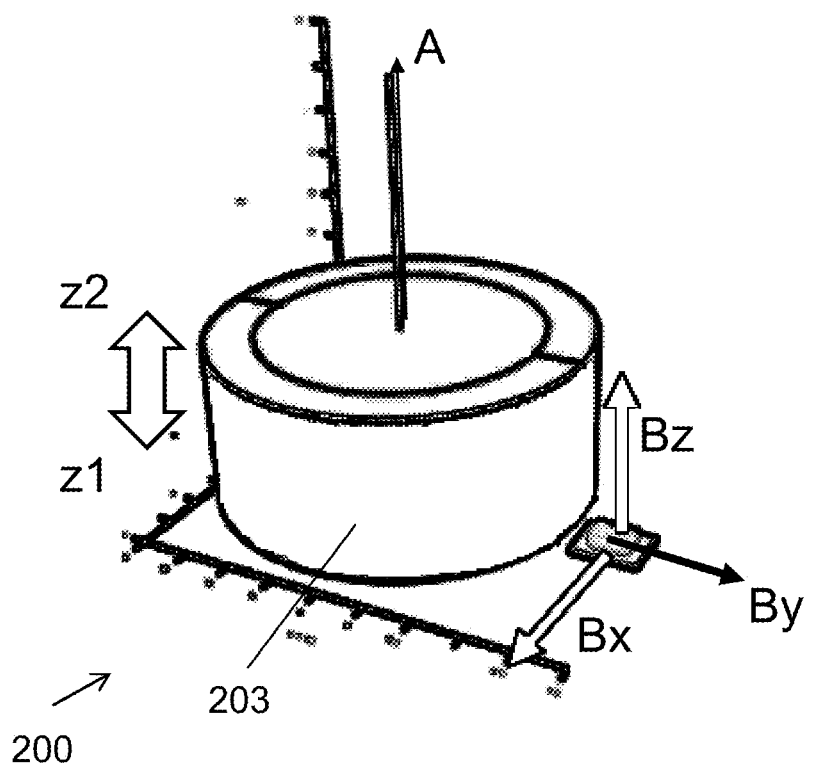
FIG. 2 shows another embodiment of the present invention, which can be seen as a variant of FIG. 1(b), wherein the magnet is movable along said axis but not necessarily rotatable about said axis. The magnet may have an unknown angular position.

FIG. 2 shows a sensor system 200 similar to the sensor system 100 of FIG. 1, wherein the magnet 203 is also movable along the A-axis from a first axial position z1 to a second axial position z2 but is not rotatable about the A-axis. Alternatively, the magnet is rotatable about the A-axis, but only the axial position is relevant for the system, for example a magnet connected to a push-button that can rotate, but only the "pressed" or "released" state of the button is relevant. Yet alternatively, the magnet is not rotatable about its axis, but the magnet is mounted in an (unknown) arbitrary angular position in a non-rotatable but only movable button. In each case, the sensor device of FIG. 2 does not need to output the angular position of the magnet but may determine the angular position internally.

Figure 3:
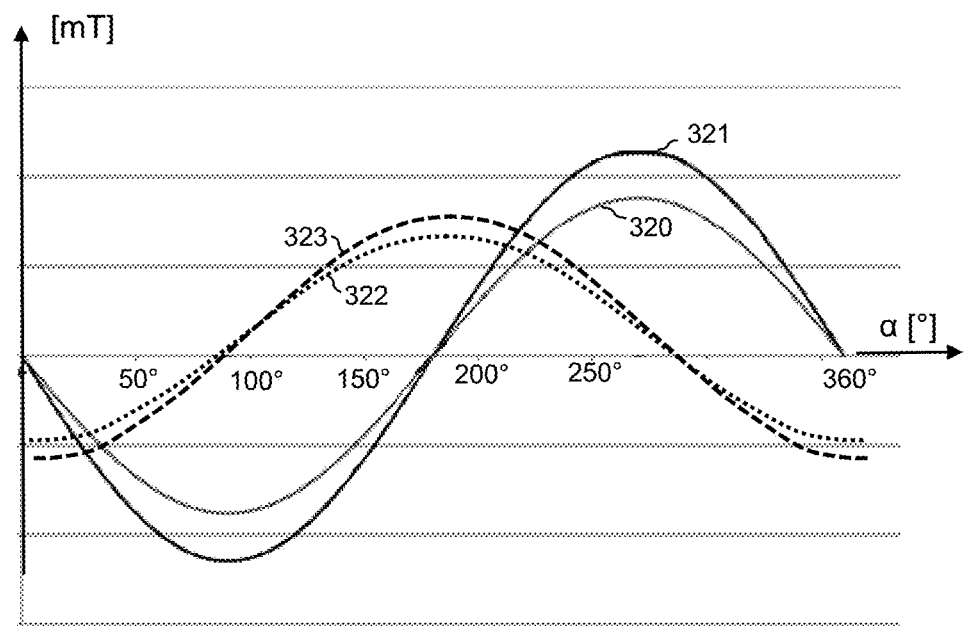
FIG. 3 shows exemplary waveforms as can be measured by the magnetic sensor device of FIG. 1 or FIG. 2. In particular.

FIG. 3 shows exemplary waveforms as can be measured by the magnetic sensor device 101 in the system of FIG. 1, in which the magnet can be in one of two predefined axial positions, referred to herein as "lower position z1" and "upper position z2.

Waveform 323 shows the magnetic field component Bx, and waveform 321 shows the magnetic field component By, when the magnet is in its lower position (z=z1), e.g. closer to the magnetic sensor device;

Waveform 322 shows the magnetic field component Bx, and waveform 320 shows the magnetic field component By, when the magnet is in its upper position (z=z2), e.g. further away from the magnetic sensor device.

The inventors had the task of determining the axial position and optionally also the angular position of the magnet relative to the magnetic sensor device, using these curves. As can be seen, these signals are not quadrature signals, hence, the techniques known in the prior art can not be used.

A possible solution would be to sample these four curves, e.g. at equidistant angular intervals (e.g. every 1° or every 2° or every 5°), and to store the value of Bx and By (or Bx and Bz, or Bx and By and Bz) for each envisioned angular and axial position in a non-volatile memory of the sensor device. During actual use, the sensor device would measure Bx and By (or Bx and Bz, or Bx and By and Bz), and would find the best matching result using a predefined distance criterion, such as for example least mean square error, e.g. defined as error=(measured Bx−stored Bx)$^2$+(measured By −stored By)$^2$), or the smallest sum of absolute differences, e.g. defined as error=|measured Bx−stored Bx|+|measured By −stored By|, where |.| means "absolute value of", or similar formulas using Bx and Bz instead of Bx and By, or similar formulas using Bx and By and Bz.

While this technique will work, it has several drawbacks. For example, it requires a relatively large amount of storage space, which is expensive, and the searching and optional interpolation may be relatively slow. The inventors had to find a solution which requires less storage space and/or which works faster, and/or which is more robust to mounting tolerances, and/or more robust against an external disturbance field, and/or more robust against temperature variations, and preferably a combination hereof.

The inventors started experimenting.

Figure 4A:
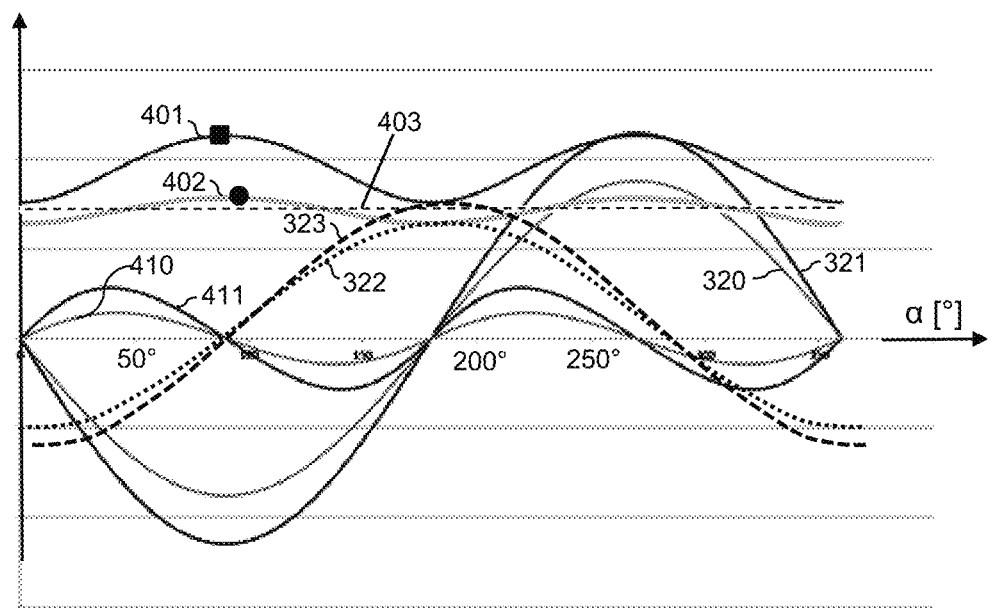
FIG. 4(a) shows the waveforms of FIG. 3 and shows waveforms (indicated by a black square and a black circle) which can be derived therefrom.

FIG. 4(a) shows a graph with a plurality of waveforms, including the Bx and By signals 320 to 323 as shown in FIG. 3. Additional waveforms are shown. The graph of FIG. 4(a) includes a horizontal axis corresponding to rotational angle α of the magnet. The graph also includes a vertical axis with several scales in arbitrary units, described below. The same applies to the graphs of FIG. 4(b) to FIG. 5(c).

Waveform 401 shows the sum of squares $|Bx|^2+|By|^2$ when the magnet is its lower position z1, and waveform 402 shows the sum of squares $|Bx|^2+|By|^2$ when the magnet is its upper position z2, for various angular positions a. Unfortunately, however, projections of these curves overlap on the vertical axis, meaning that, when Bx and By is measured, and the sum of square values is calculated, this information is not enough to unambiguously determine the axial position of the magnet.

As for the angular position, it was found that when applying the classical arctangent function of the Bx and the By values, a value for an angle was obtained, but this angle was not very accurate. The waveforms 411 and 410 show the angular error between the real angle and the angular value calculated using the arctangent of the Bx and By signal, in case the magnet was in its lower position z1 and in its upper position z2. In the example shown, the angular error lies in the range from about −10° to about +10°. While this may be acceptable for some applications, the inventors wanted to find a way to determine the angular position with higher accuracy.

The inventors continued experimenting and came to the idea of calculating the 3D-norm of the magnetic field.

Figure 4B:
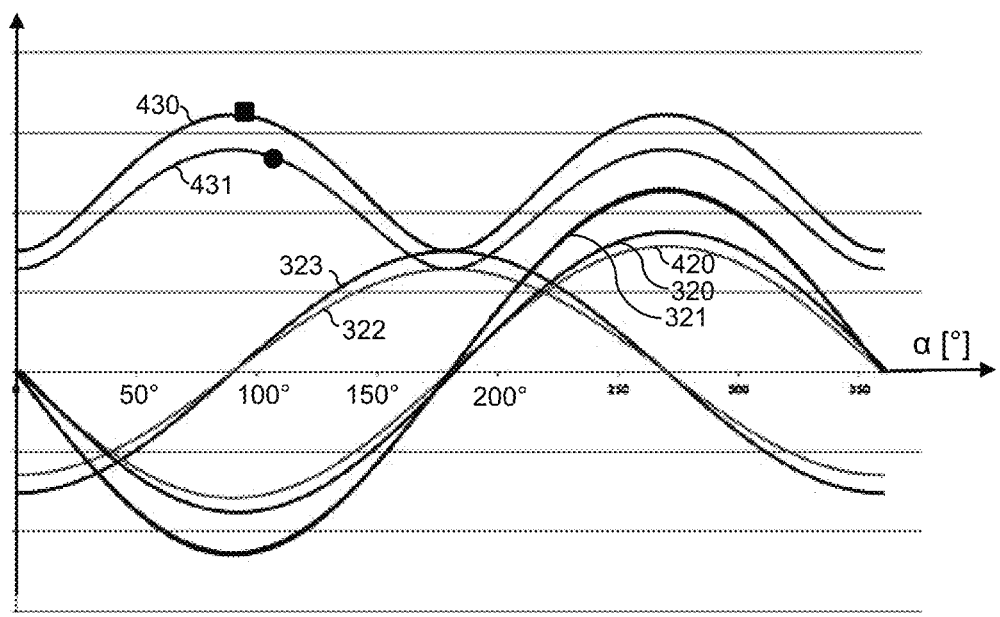
FIG. 4(b) shows the waveforms of FIG. 3, and a waveform for Bz, and shows waveforms (indicated by a black square and a black circle) which can be derived therefrom.

FIG. 4(b) shows a graph with a plurality of waveforms, including the Bx and By signals 320 to 323 as shown in FIG. 3 and FIG. 4a. Additional waveforms are shown: waveform 420 shows the waveform of the Bz component as a function of the angular position when the magnet is in its first position z1. A similar waveform can be shown for Bz when the magnet is in its second position z2, but that curve is not shown in order not to overload the drawings; waveforms 430 and 431 show the sum of the squares of $|Bx|^2+|By|^2+|Bz|^2$ when the magnet is in its first position z1, and in its second position z2.

As can be seen, a projection of the waveforms 430 and 431 on the vertical axis show even more overlap. In other words, these curves do not solve the above-mentioned problem.

The inventors continued experimenting. Not sure what to expect, the inventors came to the idea of multiplying one of the signals with a constant "K" before calculating the squares of Bx and By (or Bx and Bz) and adding these squares to obtain a sum. Several values of K were tested, and three very interesting cases are shown in FIG. 5(a) to FIG. 5(c).

Figure 5A:
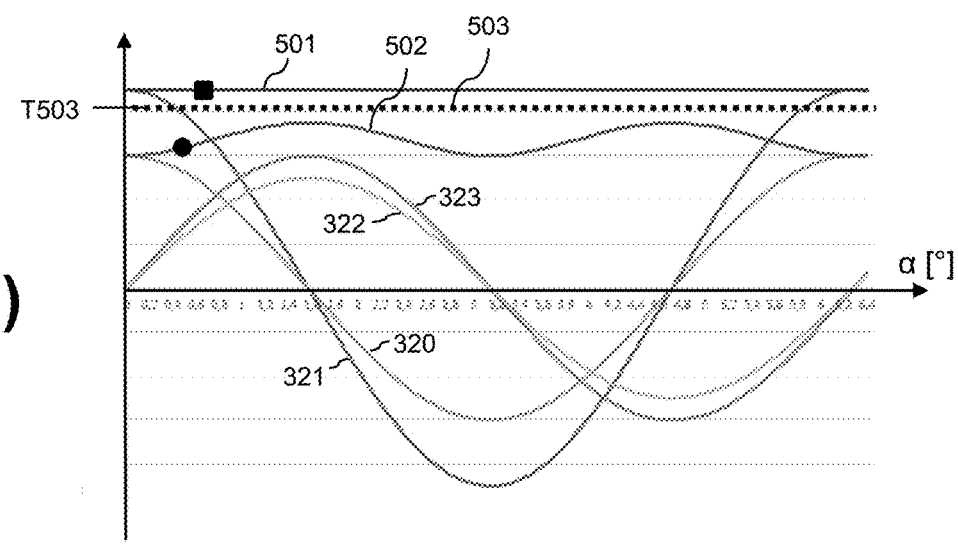
FIG. 5(a) to FIG. 5(c) show exemplary waveforms as can be measured by the magnetic sensor device of FIG. 1 or FIG. 2, and waveforms (indicated by a black square and a black circle) which can be derived therefrom, using methods proposed by the present invention.
Figure 5B:
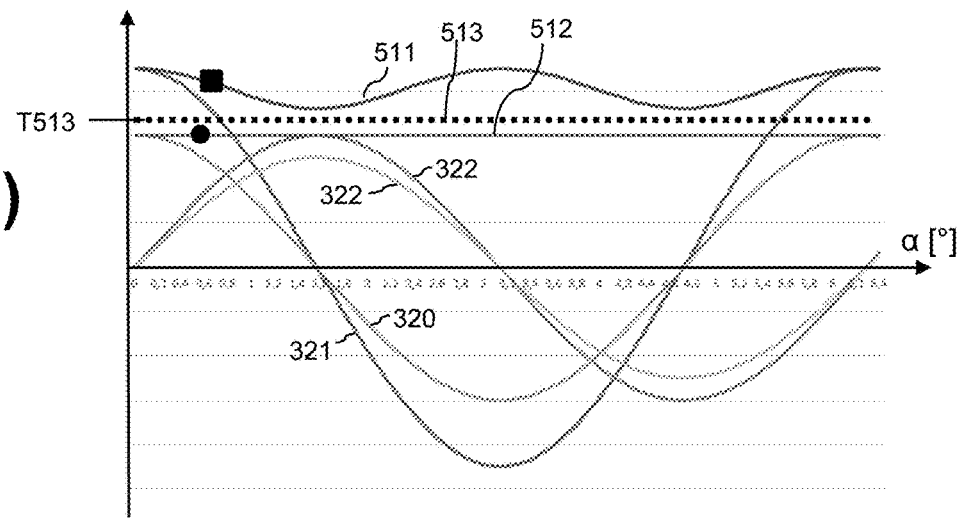
Figure 5C:
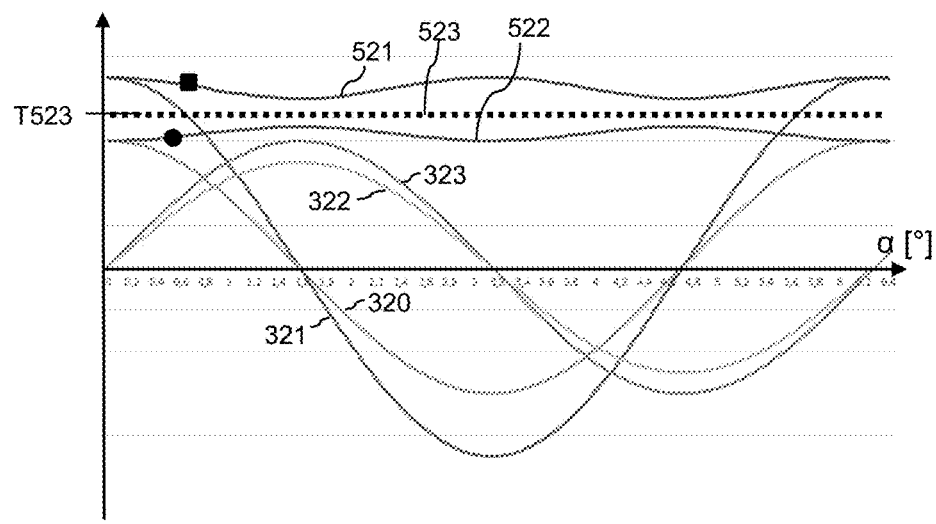

FIG. 5(a) shows the waveforms 320 to 323 representing Bx and By for two axial positions of the magnet (similar as in FIG. 3 and FIG. 4a and FIG. 4b, but 90° phase shifted), and in additional shows the waveforms 501, 502 representing sum1 and sum2 calculated as follows:

$$\text{sum1} = \text{sqrt}[(K1 \cdot Bx)^2 + (By)^2], \text{ when the magnet is in its first axial position}(z1),$$

$$\text{sum2} = \text{sqrt}[(K1 \cdot Bx)^2 + (By)^2], \text{ when the magnet is in its second axial position}(z2),$$

where sqrt(..) means the square-root-function, and where K1 was chosen approximately equal to 1.66.

Very surprisingly the waveform 501 turned out to be a straight line, such that a projection of the two waveforms 501, 502 (corresponding to sum1 and sum2 as a function of the angular position) on the vertical axis do not overlap. This in turn allows that a threshold level T503 can be chosen, corresponding to straight line 503, that lies between the two waveforms 501 and 502.

During actual use, the sensor device 101 can thus measure Bx and By, calculate a sum using the formula: sqrt[$(K1*Bx)^2+(By)^2$] and using a predefined value of K1, and testing whether this sum is smaller or larger than a predefined threshold level T503, and depending on the outcome, determine that the magnet is in its first or second axial position z1, z2.

In a variant, a sum is calculated using the formula: sum=$(K1*Bx)^2+(By)^2$, thus omitting the square-root function, and this sum is to be compared with a predefined constant T503b equal to $(T503)^2$, in order to determine whether the magnet is in its first or second axial position z1, z2.

In a similar manner, FIG. 5(b) shows the same waveforms 320 to 323 of FIG. 3, and two additional waveforms 511, 512 representing sum1' and sum2' calculated as follows:

sum1'=sqrt[$(K2*Bx)^2+(By)^2$], when the magnet is in its first axial position(z1), sum2'=sqrt[$(K2*Bx)^2+(By)^2$], when the magnet is in its second axial position(z2), where sqrt(..) means the square-root-function, and where K2 was chosen approximately equal to 1.24.

Very surprisingly, when using this value for K, the waveform 512 turned out to be a straight line, such that a projection of these two waveforms 511, 512 on the vertical axis does not overlap. This allows that a threshold level T513 can be chosen (corresponding to straight line 513), that lies between the two waveforms 511 and 512.

During actual use, the sensor device 101 can thus measure Bx and By, calculate a sum using the formula: sqrt[$(K2*Bx)^2+(By)^2$] and using a predefined value of K2, and test whether this sum is smaller or larger than a predefined threshold level T513, and depending on the outcome, determine that the magnet is in its first or second axial position z1, z2.

In a variant, a sum is calculated using the formula: sum=$(K2*Bx)^2+(By)^2$, thus omitting the square-root function, and this sum is to be compared with a predefined constant T513b equal to $(T513)^2$ in order to determine whether the magnet is in its first or second axial position z1, z2.

It was found that the sum-curves can also be separated values of K between K1 and K2, and even for values of K slightly outside this range, although the latter is not preferred. As an example, FIG. 5(c) shows the same waveforms 320 to 323 of FIG. 3, and two additional waveforms 521, 522 representing sum1" and sum2" calculated as follows:

sum1"=sqrt[$(K3*Bx)^2+(By)^2$], when the magnet is in its first axial position(z1), sum2"=sqrt[$(K3*Bx)^2+(By)^2$], when the magnet is in its second axial position(z2), where sqrt(..) means the square-root-function, and where K3 was chosen as (K1+K2)/2, which in this example is approximately equal to (1.66+1.24)/2=about 1.45.

As can be seen, the two sum-curves 521, 522 are no longer straight lines, but the "vertical distance" between the threshold level T523 (corresponding to line 523) and each of these curves is almost the same, which probably means that the tolerance level against various deviations or disturbances is improved.

In a variant, not the simple average Kavg=(K1+K2)/2 is used, but the geometrical average, calculated as: Kgeo= sqrt(K1*K2), which in this example amounts to √(1.66*1.24)=about 1.43.

In hindsight, it was found that the values of K1 and K2 can be found as the (amplitude of By-waveform)/(amplitude of Bx-waveform) when the magnet is in its first and second axial position, respectively.

Once the axial position z of the magnet is determined, the applicable value of K is known, (e.g. K1 in case the magnet was found to be in its first position z1, and K2 if the magnet was found to be in its second position z2), and the angular position can then be calculated using the formula:

angle=arctan[$(K*Bx)/By$], using the applicable value of K.

Of course, the angle does not need to be calculated in the system 200 shown in FIG. 2, where only the axial position is to be determined.

From the above, it can now be understood that, the angular position α can also be estimated with improved accuracy (as compared to the classical arctangent function of Bx and By), using the formula:

angle=arctan(Kavg*Bx/By), or angle=arctan(Kgeo*Bx/Bz), where Kavg is the simple average (or "arithmetic mean") of K1 and K2, and Kgeo is the "geometric mean" of K1 and K2. The angular error of the angle calculated using these formulas is typically only about half the error of the angle calculated by the classical arctangent function of Bx and By.

In the example above, the first magnetic field component Bx is multiplied with a value K or K1 or K2 before being squared, while the second magnetic field component By is used as it is (equivalent to being multiplied by 1). In a variant, the first magnetic field component Bx is used as is (equivalent to being multiplied by 1), while the second magnetic field component By is multiplied by a factor L, L1 or L2, before being squared and summed. In another variant, both the first magnetic field component Bx and the second magnetic field component Bz are multiplied by a predefined factor.

FIG. 5(a) to FIG. 5(c) show waveforms of Bx and By, but the present invention also works for Bx and Bz, in a similar manner, mutatis mutandis. For example, in this case a sum would be calculated as:

sum=sqrt[$(K1*Bx)^2+(Bz)^2$], where K1=(amplitude of Bz)/(amplitude of Bx) when the magnet is in its first axial position z1, or as:

sum=sqrt[$(K2*Bx)^2+(Bz)^2$], where K2=(amplitude of Bz)/(amplitude of Bx) when the magnet is in its second axial position z2, or as:

sum=sqrt[$(K*Bx)^2+(Bz)^2$], with K in the range from K1 to K2, for example K=(K1+K2)/2 or K=sqrt (K1*K2), or using the same formulas without taking the square-root, and the axial position of the magnet can be determined by comparing any of these sum-values with a corresponding predefined threshold value, and once the axial position is determined, the applicable value of K is known, and can then be used to accurately calculate the angle, using:

angle=arctan($K*Bx/Bz$), where $K=K1$ or $K2$, depending on the axial position, or if an estimate of the angular position is sufficient, one of the following formula can be used:

angle≈arctan($Kavg*Bx/Bz$), where $Kavg=(K1+K2)/2$, and means "is approximately equal to", angle≈arctan($Kgeo*Bx/Bz$), where $Kgeo=$sqrt$(K1*K2)$.

While the principles of the present invention work for both Bx in combination with By, and Bx in combination with Bz, one or the other may be better suited or may give better results depending for example on the particular magnet being used, and/or the relative position and/or orientation of the sensor device relative to the magnet, and/or the axial range of the magnet. The skilled person can easily find which solution works best for a particular situation by simply trying both and selecting the best.

While not explicitly shown, the inventors found that the same principles described above, also work when using the waveforms dBx/dx and dBy/dx instead of Bx and By, mutatis mutandis. In this case the sensor device would measure a gradient of the signal Bx along the X-direction (circumferential direction), and a gradient of the signal By along the X-direction (circumferential direction, for example using any of the sensor structures of FIG. 9(g) to FIG. 9(j) in case the sensor device 901 is oriented with its substrate perpendicular to the A-axis of the magnet, or using any of the sensor structures of FIG. 10(c) to FIG. 10(f) in case the sensor device 1001 is oriented with its substrate parallel to the A-axis of the magnet, or using other suitable sensor structures, e.g. based on magneto-resistive elements.

In this case a sum would be calculated as:

sum=sqrt$[(K1*dBx/dx)^2+(dBy/dx)^2]$, where K1=(amplitude of dBy/dx)/(amplitude of dBx/dx) when magnet is in its first position z1, or as:

sum=sqrt$[(K2*dBx/dx)^2+(dBy/dx)^2]$, where K2=(amplitude of dBy/dx)/(amplitude of dBx/dx) when magnet is in its second position z2, or as:

sum=sqrt$[(K*dBx/dx)^2+(dBy/dx)^2]$, with K in the range from K1 to K2, for example K=(K1+K2)/2 or K=sqrt(K1*K2),
or using the same formulas without taking the square-root, and the axial position of the magnet can be determined by comparing any of these sum-values with a corresponding predefined threshold value,
and once the axial position is determined, the applicable value of K is known, and can then be used to accurately calculate the angle, using:

angle=arctan($K*(dBx/dx)/(dBy/dx)$), where $K=K1$ or $K2$, depending on the axial position, or if an estimate of the angular position is sufficient, one of the following formula can be used:

angle≈arctan($Kavg*(dBx/dx)/(dBy/dx)$), where Kavg=(K1+K2)/2, and means "is approximately equal to", or:

angle≈arctan($Kgeo*(dBx/dx)/(dBy/dx)$), where Kgeo=sqrt(K1*K2).

Similar to above, instead of multiplying the first gradient with a predefined factor K or K1 or K2, it is also possible to multiply the second gradient with a predefined constant L or L1 or L2, or to multiply both gradients with a corresponding constant.

In yet another variant of the present invention, the waveforms dBx/dx and dBz/dx are used instead of dBx/dx and dBy/dx, mutatis mutandis.

In this case the sensor device would measure a gradient of the signal Bx along the X-direction, and a gradient of the signal Bz along the X-direction, for example using any of the sensor structures of FIG. 9(g) to FIG. 9(j) in case the sensor device is oriented with its substrate perpendicular to the A-axis of the magnet, or using any of the sensor structures of FIG. 10(c) to FIG. 10(f) in case the sensor device is oriented with its substrate parallel to the A-axis of the magnet, or using other suitable sensor structures, e.g. based on magneto-resistive elements.

In this case a sum would be calculated as:

sum=sqrt$[(K1*dBx/dx)^2+(dBz/dx)^2]$, where K1=(amplitude of dBz/dx)/(amplitude of dBx/dx) when magnet is in its first position z1, or as:

sum=sqrt$[(K2*dBx/dx)^2+(dBz/dx)^2]$, where K2=(amplitude of dBz/dx)/(amplitude of dBx/dx) when magnet is in its second position z2, or as:

sum=sqrt$[(K*dBx/dx)^2+(dBz/dx)^2]$, with K in the range from K1 to K2, for example K=(K1+K2)/2 or K=sqrt(K1*K2),
or using the same formulas without taking the square-root, and the axial position of the magnet can be determined by comparing any of these sum-values with a corresponding predefined threshold value,
and once the axial position is determined, the applicable value of K is known, and can then be used to accurately calculate the angle, using:

angle=arctan($K*(dBx/dx)/(dBz/dx)$), where $K=K1$ or $K2$, depending on the axial position, or if an estimate of the angular position is sufficient, one of the following formula can be used:

angle≈arctan($Kavg*(dBx/dx)/(dBz/dx)$), where Kavg=(K1+K2)/2, and ≈ means "is approximately equal to", or:

angle≈arctan($Kgeo*(dBx/dx)/(dBz/dx)$), where Kgeo=sqrt(K1*K2).

While the principles of the present invention work for both dBx/dx in combination with dBy/dx, and dBx/dx in combination with dBz/dx, one or the other may be better suited or may give better results depending for example on the particular magnet being used, and/or the relative position and/or orientation of the sensor device relative to the magnet, and/or the axial range of the magnet. The skilled person can easily find which solution works best for a particular situation by simply trying both and selecting the best.

It is an advantage of determining the axial position and/or angular position by means of a gradient signal, because these measurements are highly insensitive to an external disturbance field.

Figure 6:
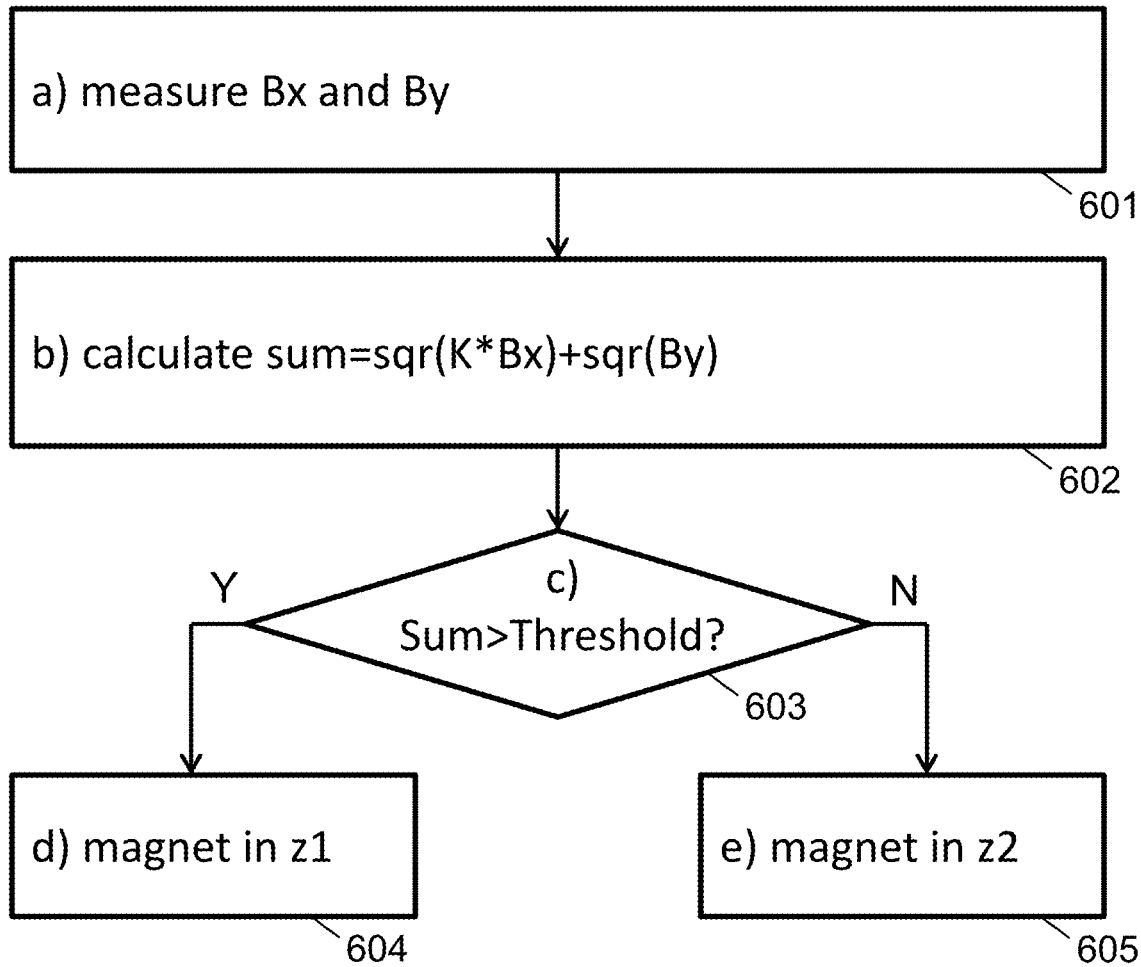
FIG. 6 shows a flowchart of a method of determining an axial position of the magnet, according to an embodiment of the present invention.

FIG. 6 shows a flowchart of a method 600 of determining an axial position (z) of the magnet in a magnetic sensor system as shown for example in FIG. 1 or FIG. 2, based on the measurement of Bx and By. The method comprises the following steps:

a) measuring in step 601 two orthogonal magnetic field components Bx and By, Bx being oriented in a circumferential direction of the magnet, By being oriented in a radial direction of the magnet;

b) calculating in step 602 a sum in accordance with the following formula:

$$sum = sqr(K*Bx) + sqr(By), \text{ where } K \text{ is a constant,}$$

or in accordance with the formula:

$$sum = sqr(Bx) + sqr(K*By), \text{ where } K \text{ is a constant,}$$

c) comparing in step 603 the sum with a predefined threshold value, and if the sum is larger than said threshold, continuing with step d) where it is determined in step 604 that the magnet is in a first predefined axial position (z1), otherwise continuing with step e) where it is determined in step 605 that the magnet is in a second predefined axial position (z2).

In an embodiment, the value of K, K1, K2, Kavg, Kgeo and/or the threshold value are predefined constants. The value of K and the value of the threshold may depend on the particular magnet being used, and/or the relative position and/or orientation of the sensor device relative to the magnet, and/or on the axial range of the magnet, and can be found for example by simulation, or by calibration.

The predefined constant K and the predefined threshold may be stored in non-volatile memory of the sensor device, and can be determined during design, by simulation, by calibration, or in any other suitable way.

In a variant of this method, step (b) further comprises measuring a temperature using a temperature sensor, and determining the value of K, K1, K2, Kavg, Kgeo, and/or the value of the threshold as a function of the measured temperature, for example using a look-up table, optionally with linear interpolation, or using a polynomial with predefined coefficients stored in said non-volatile memory.

In a variant of this method, in step a) magnetic field components Bx and Bz are measured, Bx being oriented in a circumferential direction of the magnet, Bz being oriented in an axial direction of the magnet, and in step b) a sum is calculated as: sum=sqr(K*Bx)+sqr(Bz).

In another variant of this method, in step a) magnetic field gradients dBx/dx and dBy/dx are measured, and in step b) the sum is calculated as: sum=sqr(K*dBx/dx)+sqr(dBy/dx).

In another variant of this method, in step a) magnetic field gradients dBx/dx and dBz/dx are measured, and in step b) the sum is calculated as: sum=sqr(K*dBx/dx)+sqr(dBz/dx).

Similar to above, instead of multiplying the first gradient with a factor K, it is also possible to multiply the second gradient with a factor L, etc.

Figure 7:
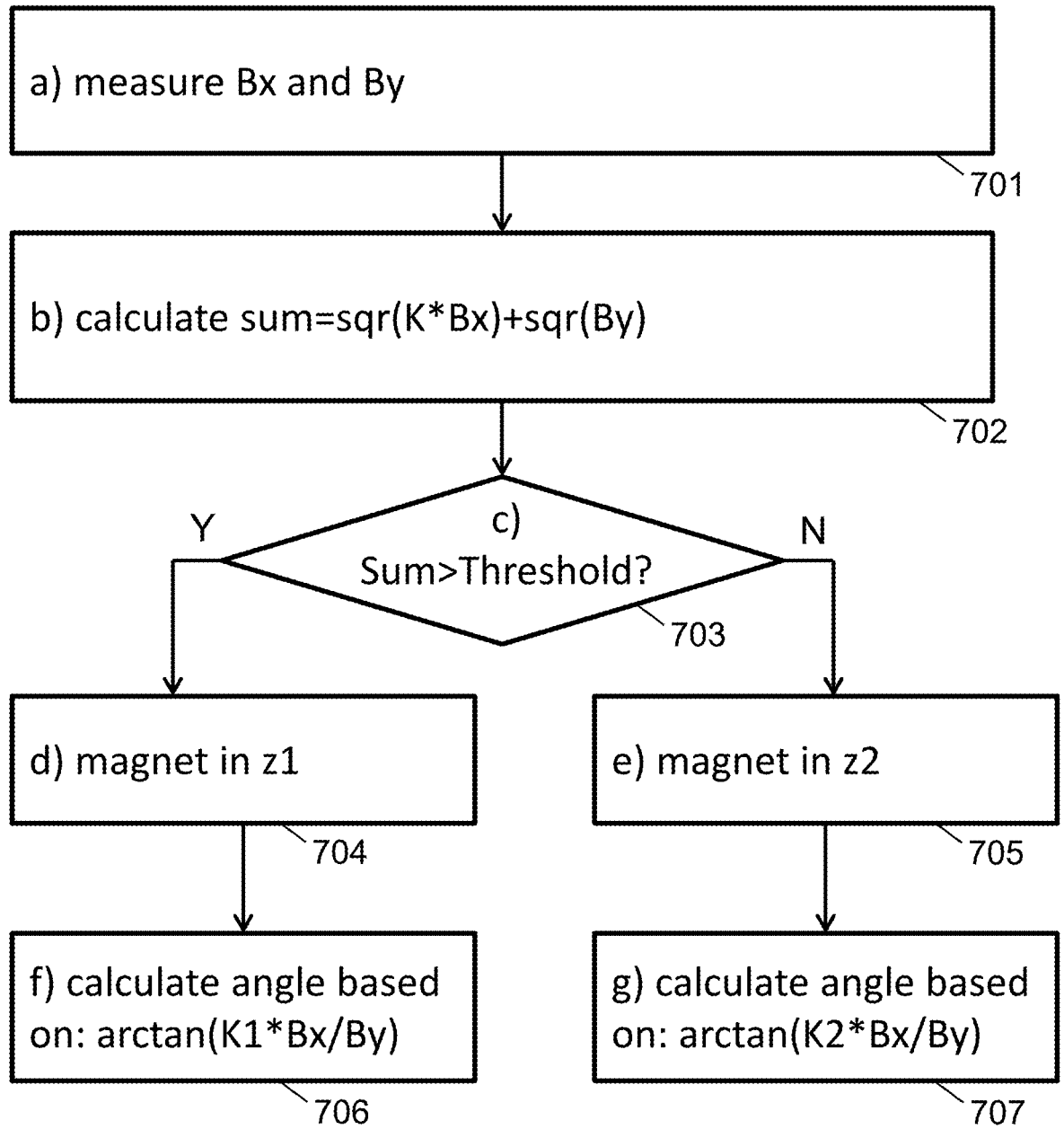
FIG. 7 and FIG. 8 show flowcharts of methods of determining an axial position and an angular position of the magnet, according to embodiments of the present invention.

FIG. 7 shows a flowchart of a method 700 of determining an axial position (z) and an angular position (a) of a magnet, as can be performed for example by a sensor device of the system shown in FIG. 1 or FIG. 2. This method can be seen as a variant of the method 600 of FIG. 6.

The steps 701 to 705 of FIG. 7 are identical to the steps 601 to 605 of FIG. 6.

In addition to the steps 701 to 705, after performing step d) where it is decided that the magnet is in its first axial position (z1), step f) is performed, in which the angular position a is calculated in step 706 based on the formula: angle=arctan(K1*Bx/By), where K1 is a first predefined constant; and after performing step e), where it is decided that the magnet is in its second axial position (z2), step g) is performed, in which the angular position α is calculated in step 707 based on the formula: angle=arctan(K2*Bx/By), where K2 is a second predefined constant, different from the first predefined constant K1.

In an embodiment, the value of K, K1, K2, Kavg, Kgeo and the threshold value(s) are predefined constants, which may be stored in a non-volatile memory.

In a variant of the method, step (b) further comprises measuring a temperature using a temperature sensor, and determining the value of K, K1, K2 and/or the value(s) of the threshold(s) as a function of the measured temperature, for example using a look-up table, optionally with linear interpolation, or using a polynomial with predefined coefficients stored in said non-volatile memory.

In a variant of this method, in step a) magnetic field components Bx and Bz are measured, and in step b) a sum is calculated based on sqr(K*Bx)+sqr(Bz), and in step f) the angle is calculated based on arctan(K1*Bx/Bz), and in step g) the angle is calculated based on arctan(K2*Bx/Bz).

In another variant of this method, in step a) magnetic field gradients dBx/dx and dBy/dx are measured, and in step b) the sum is calculated based on sqr(K*dBx/dx)+sqr(dBy/dx), and in step f) the angle is calculated based on arctan(K1*(dBx/dx)/(dBy/dx)), and in step g) the angle is calculated based on arctan((K2*(dBx/dx)/(dBy/dx)).

In another variant of this method, in step a) magnetic field gradients dBx/dx and dBz/dx are measured, and in step b) the sum is calculated based on sqr(K*dBx/dx)+sqr(dBz/dx), and in step f) the angle is calculated based on arctan(K1*(dBx/dx)/(dBz/dx)), and in step g) the angle is calculated based on arctan(K2*(dBx/dx)/(dBz/dx)).

Figure 8:
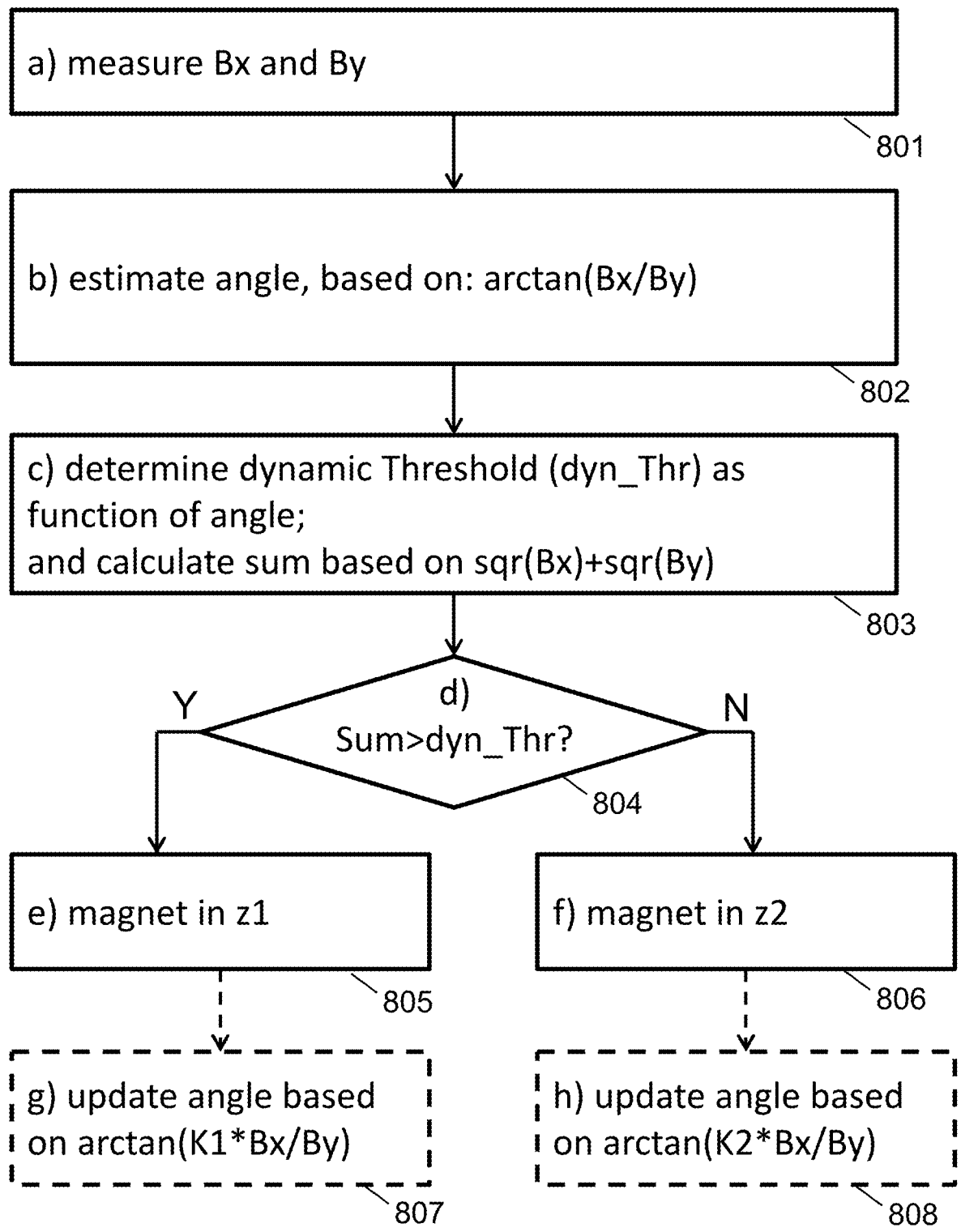

FIG. 8 show a flowchart of another method of determining an axial position and an angular position of the magnet, as can be performed for example by a sensor device of the system shown in FIG. 1 or FIG. 2. The method 800 comprises the following steps:

d) measuring in step 801 two orthogonal magnetic field component Bx and By; Bx being oriented in the X direction, circumferential to the magnet, By being oriented in the Y direction, radial to the magnet;

e) estimating in step 802 the angular position α of the magnet based on the formula: α=arctan(Bx/By);

f) calculating in step 803a a dynamic threshold value dyn_Thr as a function of the estimated angle;

and calculating in step 803b a sum based on sqr(Bx)+sqr(By);

g) comparing in step 804 the sum and the dynamic threshold dyn_Th;

and if the sum is larger than the dynamic threshold, continuing with step e) in which it is determined in step 805 that the magnet is in its first axial position z1;

otherwise continuing with step f) in which it is determined in step 806 that the magnet is in its second axial position z2.

The idea of the "dynamic threshold" or "variable threshold" is to define a threshold level which is not constant, but which is angle-dependent, for the reasons explained in FIG. 4(a), namely that a projection of the waveforms 401 and 402 on the vertical axis overlap, and that a constant level 403 cannot be used to differentiate between the curves. But, as can be appreciated, a variable threshold works, but this requires a rough estimate of the angular position. It was found that the angle provided by the traditional arctangent function of Bx/By is sufficiently accurate for this purpose.

In a variant of the method shown in FIG. 8, the method may further comprise: measuring a temperature; and step c) comprises: determining said dynamic threshold as a function of the estimated angle and of the measured temperature, and step g) and step h) further comprises: determining a value of K1 and K2 as a function of temperature.

In a variant of the method shown in FIG. 8, step (b) comprises: estimating the angular position based on arctan (Kavg*Bx/By) or arctan(Kgeo*Bx/By), for the reasons explained above. It is an advantage that this estimated angular value is a better approximation than the value obtained by the classical formula (without a K-factor).

In another or further variant of the method shown in FIG. 8, after performing step e) in which it is determined in step 805 that the magnet is in its first axial position z1; also step g) is performed in which the estimated angle is updated in step 807 based on the formula arctan (K1*Bx/By), using a first predefined constant K1; and after performing step f) in which it is determined in step 806 that the magnet is in its second axial position z2; also step h) is performed in which the estimated angle is updated in step 808 based on the formula arctan (K2*Bx/By), using a second predefined constant K2 different from the first predefined constant.

In other variants of the method shown in FIG. 8, the same steps are performed with Bx and Bz rather than Bx and By, where Bz is oriented in the Z-direction, parallel to the A-axis of the magnet.

In other variants of the method shown in FIG. 8, the same steps are performed with dBx/dx and dBy/dx rather than Bx and By.

In other variants of the method shown in FIG. 8, the same steps are performed with dBx/dx and dBz/dx rather than Bx and By.

FIG. 9 shows a sensor system or sensor arrangement 900 similar to that of FIG. 1, wherein the sensor device 901 is capable of measuring two magnetic field gradients.

The sensor device 901 has a substrate which is perpendicular to the A-axis of the magnet. A coordinate system X,Y,Z is connected to the sensor device 901, in such a way that the XY plane is parallel to the substrate and the Z-axis is perpendicular to the substrate. The sensor device 901 is oriented with the Z-axis parallel to the A-axis of the magnet, and with its X-axis in a circumferential direction of the magnet, i.e. tangential to an imaginary circle with radius Rs. The radius Rs is different from zero. The value Rs may be a value in the range from about 50% to about 200% of the outer radius Ro of the magnet, or from 50% to 95% of Ro, or from 105% to 200% of Ro, or from 110% to 150% of Ro.

Several types of magnets are shown: an axially magnetized disk magnet (FIG. 9c), a diametrically magnetized ring magnet (FIG. 9d), a diametrically magnetized disk magnet (FIG. 9e), but other magnets can also be used, such as e.g. an axially magnetized ring magnet, an axially or diametrically magnetized four-pole ring or disk magnet (also known as "quadrupole"), etc.

Figure 9A:
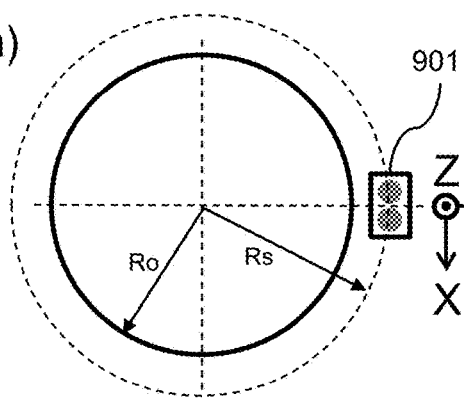
FIG. 9(a) to FIG. 9(j), and FIG. 10(a) to FIG. 10(f) show several possible magnets, and several possible sensor arrangements as can be used in embodiments of the present invention.
Figure 9C:
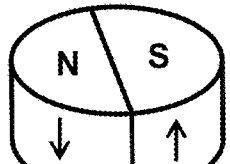
Figure 9D:
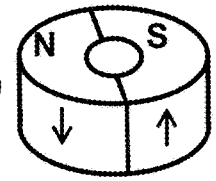
Figure 9B:
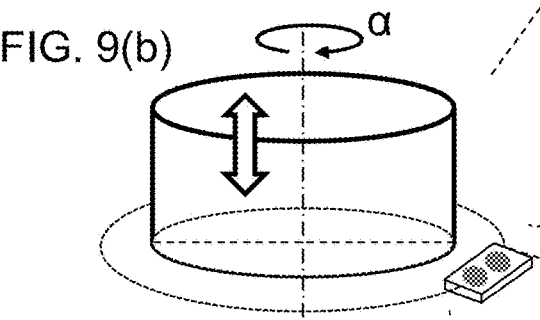
Figure 9E:
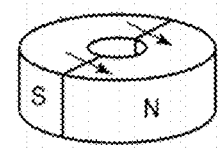
Figure 9F:
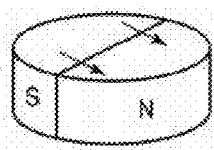
Figure 9G:
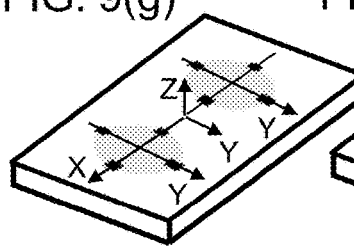
Figure 9H:
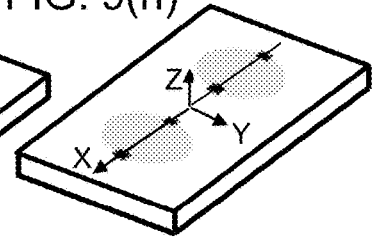
Figure 9I:
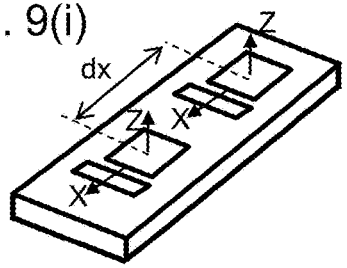
Figure 9J:
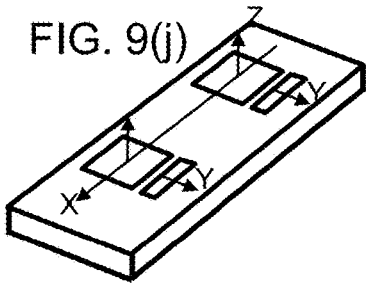

Several types of sensor structures are shown:

FIG. 9(g) shows a magnetic sensor structure with two integrated magnetic concentrators (IMC) and eight horizontal Hall elements. This structure is capable of measuring three magnetic field components Bx, By, Bz, dBx/dx, and three magnetic field gradients dBy/dx and dBz/dx, e.g. as described in more detail in EP19193068, filed by the same applicant on 22 Aug. 2019, incorporated herein by reference in its entirety;

FIG. 9(h) shows a magnetic sensor structure with two integrated magnetic concentrators (IMC) and four horizontal Hall elements. The two IMC disks are spaced apart along the X-axis. Each IMC disk has two horizontal Hall elements located on the X-axis. This structure is capable of measuring in-plane component Bx, out-of-plane component Bz, in-plane field gradient dBx/dx and out-of-plane field gradient dBz/dx;

FIG. 9(i) shows a magnetic sensor structure with two horizontal Hall elements and two vertical Hall elements. This structure is capable of measuring in-plane field component Bx, out-of-plane field component Bz, in-plane field gradient dBx/dx and an out-of-plane field gradient dBz/dx;

FIG. 9(j) shows a magnetic sensor structure with two horizontal Hall elements and two vertical Hall elements. This structure is capable of measuring two in-plane components Bx and By, and two in-plane field gradients dBx/dx and dBy/dx.

These are examples only, and the present invention is not limited hereto, and other suitable sensor structures may also be used, for example magnetic sensors using magneto-resistive elements.

FIG. 10 shows another sensor system or sensor arrangement 1000 similar to that of FIG. 1, wherein the sensor device 1001 is capable of measuring two magnetic field gradients.

The sensor device 1001 has a substrate which is parallel to the A-axis of the magnet. A coordinate system X,Y,Z is connected to the sensor device 1001, in such a way that the XY plane is parallel to the substrate and the Z-axis is perpendicular to the substrate. The sensor device 1001 is oriented with the Y-axis parallel to the A-axis of the magnet, with the Z-axis in radial direction of the magnet, and with the X-axis in a circumferential direction of the magnet, i.e. tangential to an imaginary circle with radius Rs. The radius Rs is different from zero. The value Rs may be a value in the range from about 50% to about 200% of the outer radius Ro of the magnet, or from 50% to 95% or Ro, or from 105% to 200% of Ro, or from 110% to 150% of Ro.

While not explicitly shown, the same magnets as mentioned in FIG. 9 can also be used here.

Figure 10A:
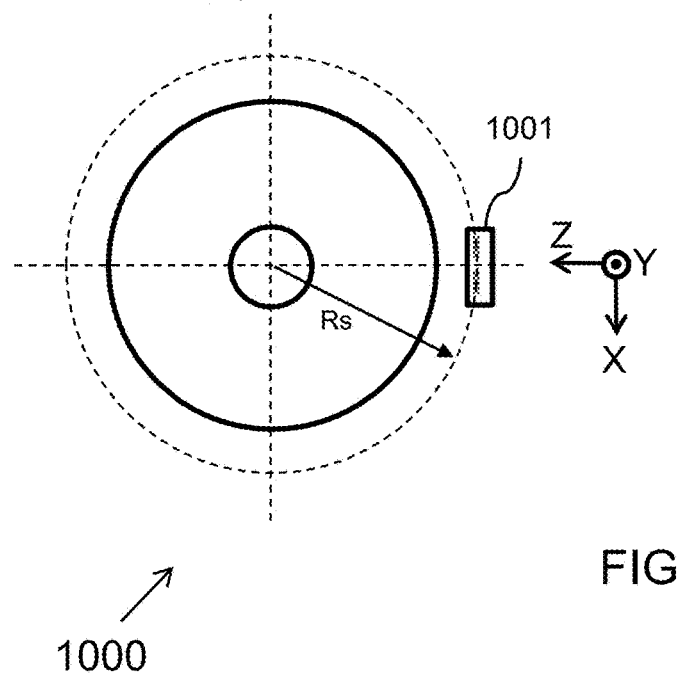
Figure 10B:
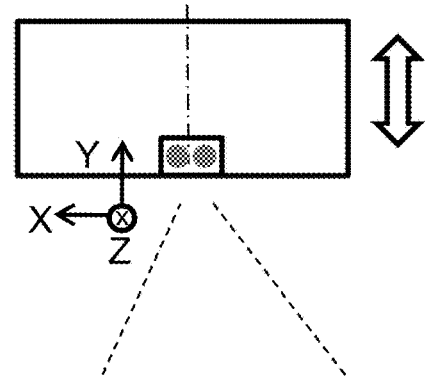
Figure 10C:
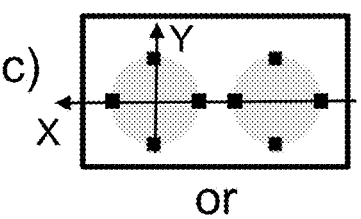
Figure 10D:
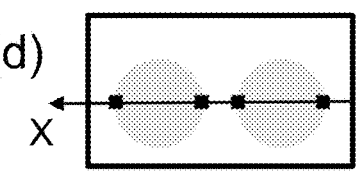
Figure 10E:
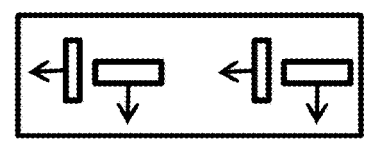
Figure 10F:
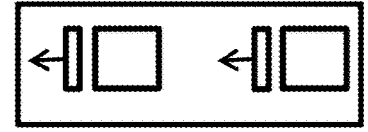

Several types of sensor structures are shown:

FIG. 10(c) shows a magnetic sensor structure with two integrated magnetic concentrators (IMC) spaced apart along the X-axis, and eight horizontal Hall elements arranged at the periphery of the IMC disks, similar as in FIG. 9(g). This structure is capable of measuring Bx, By, Bz, dBx/dx, dBy/dx and dBz/dx;

FIG. 10(d) shows a magnetic sensor structure with two integrated magnetic concentrators (IMC) and four horizontal Hall elements, all located on the X-axis. This structure is capable of measuring Bx (circumferential direction of the magnet), Bz (radial direction of the magnet), dBx/dx and dBz/dx;

FIG. 10(e) shows a magnetic sensor structure with four vertical Hall elements, two being oriented in the X-direction (circumferential direction of the magnet) and two being oriented in the Y-direction (axial direction of the magnet). This structure is capable of measuring Bx, By, dBx/dx and dBy/dx;

FIG. 10(f) shows a magnetic sensor structure with two horizontal Hall elements and two vertical Hall elements. This structure is capable of measuring Bx (circumferential direction of the magnet), Bz (radial direction of the magnet), dBx/dx and dBz/dx.

These are examples only, and the present invention is not limited hereto, and other suitable sensor structures may also be used, for example magnetic sensors using magneto-resistive elements.

In a variant of the system of FIG. 10, the sensor device is oriented in the same way as shown in FIG. 10 but contains only one sensor elements at one sensor location rather than two. Such a sensor device is not capable of measuring the gradient signals mentioned above (in relation to FIG. 10c to FIG. 10f), but only the magnetic field components.

Figure 11:
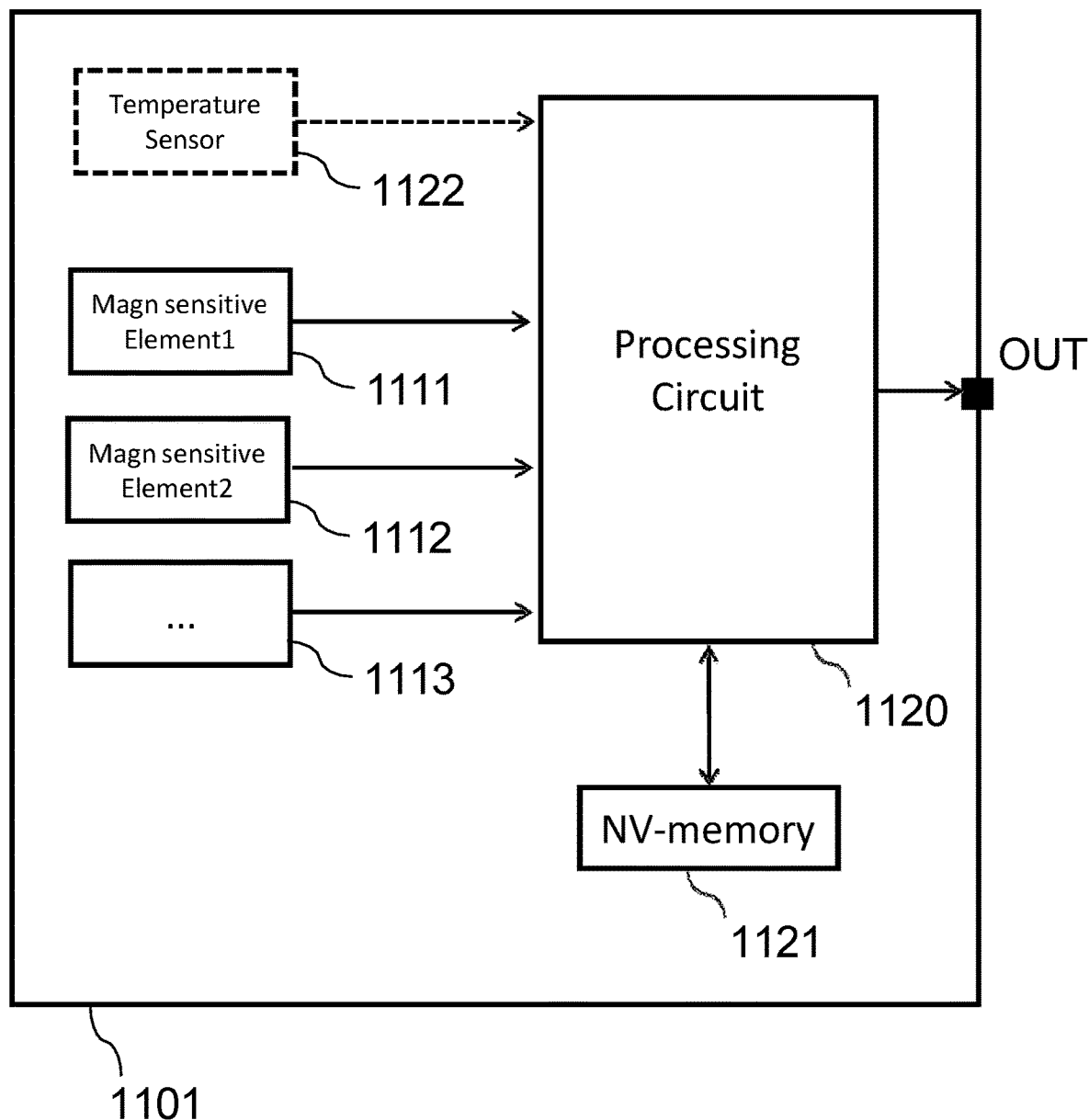
FIG. 11 shows a high-level block diagram of the sensor device as can be used in embodiments of the present invention.

FIG. 11 is a schematic block diagram of an exemplary magnetic sensor device 1101 as can be used in embodiments of the present invention. Magnetic sensor devices of this kind, but using different algorithms, are known in the art. It suffices therefore to provide only a brief explanation for completeness.

The magnetic sensor device 1101 of FIG. 11 comprises a plurality of magnetic sensitive elements 1111, 1112, 1113 arranged in a particular manner on a semiconductor substrate, for example as described in FIG. 1, FIG. 9 or FIG. 10.

The magnetic sensor device 1101 further comprises a processing circuit, for example a programmable processing unit 1120 for obtaining and/or combining signals obtained from the magnetic sensitive elements (e.g. from the horizontal Hall and/or vertical Hall elements) to determine one or more magnetic field components Bx, By, Bz and/or magnetic field gradients dBx/dx, dBy/dx, dBz/dx.

The magnetic sensor device 1101 may optionally comprise a temperature sensor 1122, connected to the processing circuit.

According to the principles of the present invention, the processing circuit is further configured for performing one or more of the methods illustrated in FIG. 6 to FIG. 8, or the variants thereof, meaning that the processing circuit is capable of calculating a square, calculating a sum, calculating an arctangent function, comparing a sum and a threshold, etc.

As shown in FIG. 11, the processing circuit 1120 may comprise or may be connected to a non-volatile memory 1121 storing code fragments and/or one or more predefined constants, e.g. K1, K2, Kavg, Kgeo, and/or one or more of the predefined threshold values T503, T513, T523, and/or other parameters or values described above.

While not explicitly shown, the sensor device typically also further comprises biasing circuitry, readout circuitry, one or more amplifiers, analog-to-digital convertors (ADC), etc. for biasing and reading out the magnetic sensitive elements. Such circuits are well known in the art and are not the main focus of the present invention.

The processing circuit may be configured for outputting only an axial position of the magnet or may be configured for outputting both an axial position and an angular position of the magnet.

The invention has been described referring to only two predefined axial positions z1 and z2, but of course, the same techniques can also be used to differentiate between more than two axial positions, for example three axial positions. The axial position can then for example be determined in two steps, where in a first step a first sum is calculated using a first value of K to eliminate one of the three possible curves, in a manner similar as explained in FIG. 5(a) to FIG. 5(c), and in a second step a second sum is calculated using a second value of K, to differentiate between the remaining two curves. But the invention can also be used to differentiate between more than three axial positions, e.g. at least four axial positions.

The invention claimed is:

1. A magnetic sensor system comprising:
a permanent magnet movable along an axis between a first predefined axial position and a second predefined axial position, and being rotatable about said axis or having an unknown angular position ($\alpha$) about said axis, and generating a magnetic field which is not circular symmetric about said axis;
a magnetic sensor device located at an offset from said axis, and comprising a first set of magnetic sensitive elements located in a first sensor location and configured for measuring at least a first magnetic field component oriented in a first direction and a second magnetic field component oriented in a second direction perpendicular to the first direction;
wherein the magnetic sensor device is oriented such that the first direction is oriented substantially circumferential with respect to said axis, and such that the second direction is oriented either substantially parallel to the axis or substantially radial to the axis;
wherein the magnetic sensor device further comprises a processing circuit; and
wherein the processing circuit is configured for calculating a product of the first or the second magnetic field component and a predefined constant, and for calculating a sum of a square of this product and a square of the other of said first and said second magnetic field components; or
wherein the magnetic sensor device further comprises a second set of magnetic sensitive elements in a second sensor location spaced from the first sensor location in the first direction, and configured for measuring a third magnetic field component parallel to the first magnetic field component, and a fourth magnetic field component parallel to the second magnetic field component, and wherein the processing circuit is configured for calculating a first magnetic field gradient based on the first and the third magnetic field components, and for calculating a second magnetic field gradient based on the second and the fourth magnetic field components, and for calculating a product by multiplying one of the first and the second magnetic field gradients with a predefined constant, and for calculating a sum of a square of this product and a square of the other magnetic field gradient;
wherein the processing circuit is further configured for determining an axial position of the magnet by comparing the sum with a threshold value; and
wherein a value of the predefined constant is different from 1.

2. The magnetic sensor system according to claim 1,
wherein the magnet is a ring or disk magnet having at least one North pole and at least one South pole at a top surface, and having at least one North pole and at least one South pole at a bottom surface; or
wherein the magnet is a radially magnetized ring or disk magnet; or
wherein the magnet is a diametrically magnetized ring or disk magnet.

3. The magnetic sensor system according to claim 1, wherein the processing circuit is further configured for calculating an angular position of the magnet based on a product of another predefined constant and a ratio of the first magnetic field component and the second magnetic field component.

4. The magnetic sensor system according to claim 1, wherein the processing circuit is further configured for estimating or calculating an angular position of the magnet based at least on the first and the second magnetic field gradient.

5. The magnetic sensor system according to claim 4, wherein the processing circuit is further configured for estimating the angular position of the magnet based on a ratio of the first magnetic field gradient and the second magnetic field gradient; and wherein the processing circuit is configured for determining a dynamic threshold as a function of the estimated angular position; and wherein the processing circuit is further configured for determining a sum of a square of the first magnetic field gradient and a square of the second magnetic field gradient, and for comparing the sum with the dynamic threshold; and if the sum is larger than said dynamic threshold, to determine that the magnet is in the first predefined axial position along said axis; and if the sum is smaller than said dynamic threshold, to determine that the magnet is in the second predefined axial position along said axis.

6. The magnetic sensor system according to claim 5, wherein the processing circuit is further configured for updating the estimated angular position based on a product of a first predefined constant and the ratio of the first magnetic field gradient and the second magnetic field gradient if the magnet is in the first predefined axial position, and for updating the estimated angular position based on a product of a second predefined constant and the ratio of the first magnetic field gradient and the second magnetic field gradient if the magnet is in the second predefined axial position.

7. The magnetic sensor system according to claim 1, wherein the processing circuit is further configured for estimating an angular position of the magnet based on a ratio of the first magnetic field component and the second magnetic field component; and wherein the processing circuit is configured for determining a dynamic threshold as a function of the estimated angular position; and wherein the processing circuit is further configured for determining a sum of a square of the first magnetic field component and a square of the second magnetic field component, and for comparing the sum with the dynamic threshold; and if the sum is larger than said dynamic threshold, to determine that the magnet is in the first predefined axial position along said axis; and if the sum is smaller than said dynamic threshold, to determine that the magnet is in the second predefined axial position along said axis.

8. The magnetic sensor system according to claim 7, wherein the processing circuit is further configured for updating the estimated angular position based on a product of a first predefined constant and the ratio of the first magnetic field component and the second magnetic field component if the magnet is in the first predefined axial position, and for updating the estimated angular position based on a product of a second predefined constant and the ratio of the first magnetic field component and the second magnetic field component if the magnet is in the second predefined axial position.

9. The magnetic sensor system according to claim 1, wherein the magnet is a ring or disk magnet having a top surface and a bottom surface and a cylindrical wall with an outer radius; and wherein the sensor device is located at a radial distance from said axis larger than said outer radius; and wherein the magnetic sensor device is located outside of a space between a top plane containing or tangential to said top surface and a bottom plane containing or tangential to said bottom surface when the magnet is in at least one of the first and the second predefined axial positions.

10. The magnetic sensor device for use in the magnetic sensor system according to claim 1, the magnetic sensor device comprising:

a substrate comprising the first set of magnetic sensitive elements located in the first sensor location, configured for measuring at least the first magnetic field component oriented in the first direction and the second magnetic field component oriented in the second direction perpendicular to the first direction;

the processing circuit configured for determining the axial position of the magnet or for determining whether the magnet is located in the first predefined axial position or the second predefined axial position based on at least the first magnetic field component and the second magnetic field component, or values derived therefrom.

11. A method of determining at least an axial position of a permanent magnet using a magnetic sensor device, the magnet being movable along an axis between a first predefined axial position and a second predefined axial position, rotatable about said axis or having an unknown angular position (a) about said axis, and the magnet generating a magnetic field which is not circular symmetric about said axis, the method comprising:

providing the magnetic sensor device located at an offset from said axis, the magnetic sensor device comprising a first set of magnetic sensitive elements located in a first sensor location;

measuring at the first sensor location a first magnetic field component oriented in a first direction and a second magnetic field component oriented in a second direction perpendicular to the first direction, the magnetic sensor device being oriented such that the first direction is oriented substantially circumferential with respect to said axis, and such that the second direction is oriented either substantially parallel to the axis or substantially radial to the axis;

calculating a product of the first or the second magnetic field component and a predefined constant, and further calculating a sum of a square of this product and a square of the other of said first and said second magnetic field components; or providing a second set of magnetic sensitive elements of the magnetic sensor device at a second sensor location spaced from the first sensor location in the first direction, measuring a third magnetic field component parallel to the first magnetic field component, and a fourth magnetic field component parallel to the second magnetic field component, calculating a first magnetic field gradient based on the first and the third magnetic field components, and a second magnetic field gradient based on the second and the fourth magnetic field components, and calculating a product by multiplying one of the first and the second magnetic field gradients with a predefined constant, and further calculating a sum of a square of this product and a square of the other magnetic field gradient;

determining the axial position of the magnet by comparing the sum with a threshold value;

wherein a value of the predefined constant is different from 1.

12. The method according to claim 11,
wherein the magnet is a ring or disk magnet having at least one North pole and at least one South pole at a top surface, and having at least one North pole and at least one South pole at a bottom surface; or
wherein the magnet is a radially magnetized ring or disk magnet; or
wherein the magnet is a diametrically magnetized ring or disk magnet.

13. The method according to claim 11, further comprising calculating an angular position of the magnet based on a product of another predefined constant and a ratio of the first magnetic field component and the second magnetic field component.

14. The method according to claim 11, further comprising estimating or calculating an angular position of the magnet based at least on the first and the second magnetic field gradient.

15. The method according to claim 14, further comprising:
estimating the angular position of the magnet based on a ratio of the first magnetic field gradient and the second magnetic field gradient; and
determining a dynamic threshold as a function of the estimated angular position; and
determining a sum of a square of the first magnetic field gradient and a square of the second magnetic field gradient, and comparing the sum with the dynamic threshold; and
when the sum is larger than said dynamic threshold, determining that the magnet is in the first predefined axial position along said axis; and
when the sum is smaller than said dynamic threshold, determining that the magnet is in the second predefined axial position along said axis.

16. The method according to claim 15, further comprising:
updating the estimated angular position based on a product of a first predefined constant and the ratio of the first magnetic field gradient and the second magnetic field gradient when the magnet is in the first predefined axial position, and
updating the estimated angular position based on a product of a second predefined constant and the ratio of the first magnetic field gradient and the second magnetic field gradient when the magnet is in the second predefined axial position.

17. The method according to claim 11, further comprising:
estimating an angular position of the magnet based on a ratio of the first magnetic field component and the second magnetic field component; and
determining a dynamic threshold as a function of the estimated angular position; and
determining a sum of a square of the first magnetic field component and a square of the second magnetic field component, and comparing the sum with the dynamic threshold; and
when the sum is larger than said dynamic threshold, determining that the magnet is in the first predefined axial position along said axis; and
when the sum is smaller than said dynamic threshold, determining that the magnet is in the second predefined axial position along said axis.

18. The method according to claim 17, further comprising:
updating the estimated angular position based on a product of a first predefined constant and the ratio of the first magnetic field component and the second magnetic field component when the magnet is in the first predefined axial position, and
updating the estimated angular position based on a product of a second predefined constant and the ratio of the first magnetic field component and the second magnetic field component when the magnet is in the second predefined axial position.

19. The method according to claim 11,
wherein the magnet is a ring or disk magnet having a top surface and a bottom surface and a cylindrical wall with an outer radius; and
wherein the sensor device is located at a radial distance from said axis larger than said outer radius; and
wherein the magnetic sensor device is located outside of a space between a top plane containing or tangential to said top surface and a bottom plane containing or tangential to said bottom surface when the magnet is in at least one of the first and the second predefined axial positions.

20. A magnetic sensor system comprising:
a permanent magnet movable along an axis between a first axial position and a second axial position, and being rotatable about said axis or having an unknown angular position (a) about said axis, and generating a magnetic field which is not circular symmetric about said axis;
a magnetic sensor device located at an offset from said axis, and comprising a first set of magnetic sensitive elements located in a first sensor location and configured for measuring at least a first magnetic field component oriented in a first direction and a second magnetic field component oriented in a second direction perpendicular to the first direction;
wherein the magnetic sensor device is oriented such that the first direction is oriented substantially circumferential with respect to said axis, and such that the second direction is oriented either substantially parallel to the axis or substantially radial to the axis; and
wherein the magnetic sensor device further comprises a processing circuit configured for determining an axial position of the magnet along said axis based on at least the first magnetic field component and the second magnetic field component, or values derived therefrom; and
wherein the processing circuit is configured for estimating an angular position of the magnet based on a ratio of the first magnetic field component and the second magnetic field component; and
wherein the processing circuit is configured for determining a dynamic threshold as a function of the estimated angular position; and
wherein the processing circuit is further configured for determining a sum of a square of the first magnetic field component and a square of the second magnetic field component, and for comparing the sum with the dynamic threshold; and
if the sum is larger than said dynamic threshold, to determine that the magnet is in a first predefined axial position along said axis; and
if this sum is smaller than said threshold, to determine that the magnet is in a second predefined axial position along said axis.

* * * * *